United States Patent [19]
Imaizumi

[11] Patent Number: 5,473,308
[45] Date of Patent: Dec. 5, 1995

[54] REMOTE SUPERVISORY SYSTEM FOR NETWORK ELEMENTS

[75] Inventor: Hideki Imaizumi, Kawasaki, Japan

[73] Assignee: Fujitsu Limited, Kanagawa, Japan

[21] Appl. No.: 189,409

[22] Filed: Jan. 31, 1994

[30] Foreign Application Priority Data

Sep. 3, 1993 [JP] Japan .................................. 5-219593

[51] Int. Cl.⁶ ................................................. G08B 29/02
[52] U.S. Cl. ......................... 340/506; 340/505; 340/518;
340/825.52; 340/825.54
[58] Field of Search .................................. 340/505, 538,
340/825.06, 825.54, 506, 518, 825.52, 825.54

[56] References Cited

U.S. PATENT DOCUMENTS 4,752,698  6/1988  Furuyama et al. ...................... 340/506
5,017,905  5/1991  Yuchi ...................................... 340/505
5,227,763  7/1993  Kikuchi .................................. 340/518

*Primary Examiner*—John K. Peng
*Assistant Examiner*—Daniel J. Wu

[57] ABSTRACT

Disclosed is a remote supervisory system in which slave supervisory apparatus (S-SV) for supervising network elements can be polled from a master supervisory apparatus (M-SV), and yet each S-SV is able to send an alarm signal to the M-SV at any appropriate time. In this system, a first transmission path connected to the M-SV is connected via a switch to a second transmission path leading from each S-SV. The switch is controlled in accordance with the presence of a signal on the first transmission path and also with the presence of a signal on the second transmission path.

18 Claims, 34 Drawing Sheets

Fig.3

| A | B | OUTPUT |
|---|---|--------|
| 0 | 0 | 0 |
| 0 | 1 | 1 |
| 1 | 0 | 1 |
| 1 | 1 | 0 |

5,473,308

REMOTE SUPERVISORY SYSTEM FOR NETWORK ELEMENTS

BACKGROUND OF THE INVENTION

1. Field of the Invention

The present invention relates to a centralized supervisory system, and more particularly to a remote supervisory system that can reduce a time delay occurring at a master station (the central station) in detecting alarms from slave stations (the stations supervised by the master station).

2. Description of the Related Art

Usually, in a communications network, slave stations are provided which supervise network elements, such as transmitting equipment, that form part of the communications network, and a master station having the facilities for remotely supervising the slave stations is provided, thus implementing a remote supervisory system for remotely supervising the network elements at the master station.

Generally, in this type of remote supervisory system, a polling selection system is employed. In polling, master supervisory equipment (M-SV) responsible for centralized supervision transmits a polling signal (a send request signal) to slave supervisory equipment (S-SV) provided for network elements (NEs), in response to which signal the S-SV reports the current conditions of the NEs to the M-SV. The polling signal is sent out at fixed time intervals; the signal can also be sent out at any desired time when a maintenance person makes a request by designating a specific NE or all the NEs. This polling system has the advantage that the condition of any specific NE or all the NEs can be checked at any time since the maintenance person can transmit a send request at any desired time. On the other hand, the disadvantage of this system is that there is a time lag between the occurrence of an alarm and the detection of that alarm because a fault condition (alarm) occurring at a certain NE cannot be detected by the M-SV unless the M-SV issues a send request to the S-SV that supervises the NE that is causing the alarm.

On the other hand, an instantaneous alarm transmit system is known whereby an alarm is sent to the M-SV upon the occurrence of an alarm condition. With this system, an alarm can be detected without delay, but the drawback is that the M-SV cannot issue a send request to the S-SV.

SUMMARY OF THE INVENTION

It is an object of the present invention to provide a remote supervisory system that overcomes the disadvantages of the above-described polling system and the instantaneous alarm system while retaining their advantages.

According to the present invention, there is provided a remote supervisory system for centralized supervision of a plurality of network elements forming a communications network, comprising: a plurality of slave supervisory apparatuses coupled to the respective network elements; a master supervisory apparatuses; a first transmission path coupled to the master supervisory apparatus; a plurality of second transmission paths coupled to the respective slave supervisory apparatus; a plurality of switch means connected between the first transmission path and the plurality of second transmission paths; and control means for controlling the switch means in accordance with the presence of a signal on the first transmission path and also with the presence of a signal on the second transmission paths.

BRIEF DESCRIPTION OF THE DRAWINGS

FIG. 3 is a diagram showing truth values for the operation of an XOR circuit contained in a relay activator;

FIG. 25 is a block diagram showing the configuration of

DESCRIPTION OF THE PREFERRED EMBODIMENTS

Figure 1:
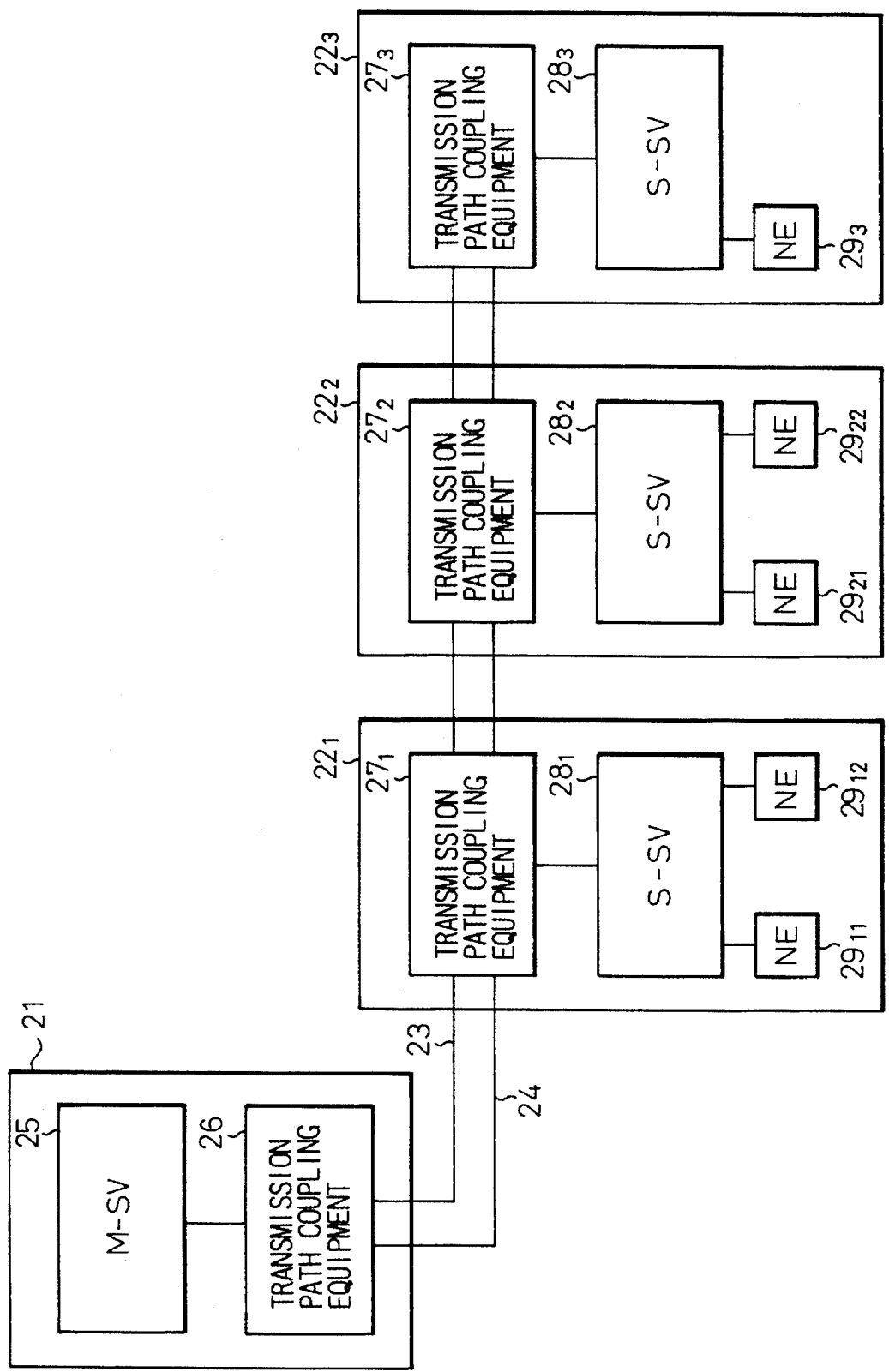
FIG. 1 is a block diagram showing an overall configuration of one embodiment of the present invention.

FIG. 1 shows an overall configuration of one embodiment of the present invention, wherein balanced lines are used. A master station indicated at 21 constitutes a central station responsible for centralized supervision within the system. Stations indicated at $22_1$, $22_2$, and $22_3$ are slave stations supervised by the master station. The number of slave stations is not limited to three, but any desired number of slave stations may be provided. The master station 21 and the slave stations, $22_1$, $22_2$, $22_3$, are interconnected by a positive-polarity transmission path 23 and a negative-polarity transmission path 24.

The master station 21 comprises master supervisory equipment (M-SV) 25 and transmission path coupling equipment 26. The slave stations, $22_1$, $22_2$, $22_3$, comprise transmission path coupling equipment, $27_1$, $27_2$, $27_3$, and slave supervisory equipment (S-SV), $28_1$, $28_2$, $28_3$, respectively. The S-SVs, $28_1$, $28_2$, $28_3$, have network elements (NEs), such as transmitting equipment, ($29_{11}$, $29_{12}$), ($29_{21}$, $29_{22}$) and $29_3$ under their respective control.

The S-SVs, $28_1$, $28_2$, $28_3$, monitor the NEs ($29_{11}$, $29_{12}$), ($29_{21}$, $29_{22}$) and $29_3$ under their respective control, and gather necessary supervisory information. The M-SV 25 centrally supervises the S-SVs, $28_1$, $28_2$, $28_3$, at the respective slave stations via the positive-polarity transmission path 23 and negative-polarity transmission path 24, and gathers necessary supervisory information. The positive-polarity transmission path 23 and the negative-polarity transmission path 24 carry the same signal in the form of a digital signal consisting of symmetrical positive and negative pulses.

Figure 2:
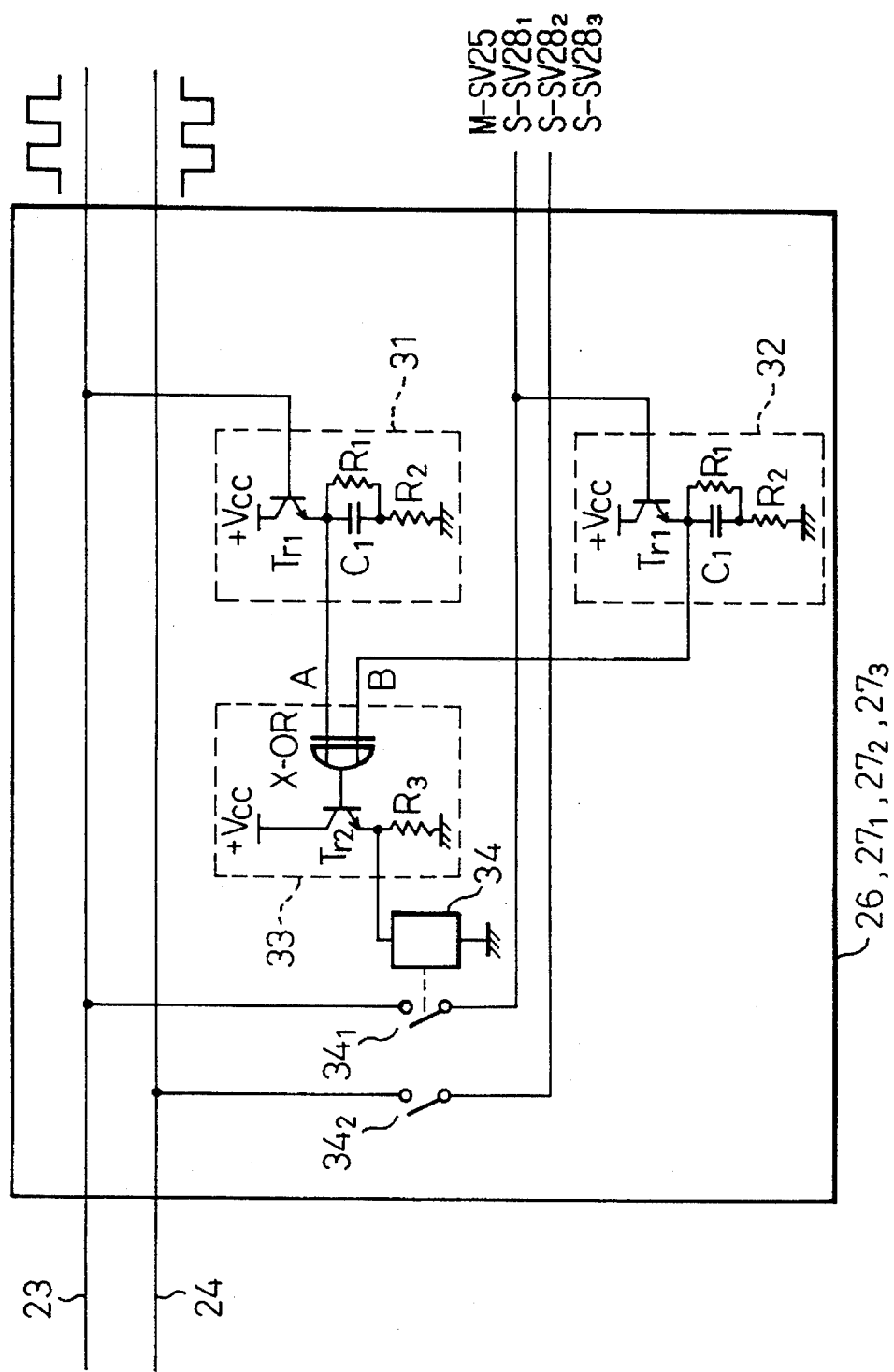
FIG. 2 is a circuit diagram showing the configuration of transmission path coupling equipment in the embodiment shown in FIG. 1.

FIG. 2 is a diagram showing the configuration of each transmission path coupling equipment in the embodiment shown in FIG. 1; the same parts as those shown in FIG. 1 are designated by the same reference numerals. In the figure, the numerals 31 and 32 designate preamble signal detectors each consisting of a transistor $Tr_1$, a capacitor $C_1$, and resistors $R_1$ and $R_2$. The numeral 33 indicates a relay activator which consists of an exclusive-OR circuit XOR, a transistor $Tr_2$, and a resistor $R_3$. A relay 34 includes contacts $34_1$ and $34_2$.

In the preamble signal detectors 31 and 32, when a preamble signal consisting of pulses representing 1s is received, the transistor $Tr_1$ is turned on, and the capacitor $C_1$ is charged by power supply +Vcc, thus producing a continuous "1" output. The preamble signal is transmitted prior to the transmission of a supervisory signal or a polling signal. When the signal has ceased, the capacitor $C_1$ discharges through the resistor $R_1$, so that the output of the preamble signal detector 31, 32 becomes "0".

In the relay activator 33, when either one of the preamble detectors, 31 or 32, is ON and the other one is OFF, the XOR outputs a "1", by which the transistor $Tr_2$ is turned on and the relay 34 is activated to close the contacts $34_1$, $34_2$.

Thus, in a receive mode, the signal output on the positive-polarity transmission path 23 and negative-polarity transmission path 24 is received by the M-SV 25 or the S-SVs, $28_1$, $28_2$, $28_3$. In a transmit mode, the signal output from the M-SV 25 or the S-SVs, $28_1$, $28_2$, $28_3$, is transmitted over the positive-polarity transmission path 23 and negative-polarity transmission path 24.

Figure 3:
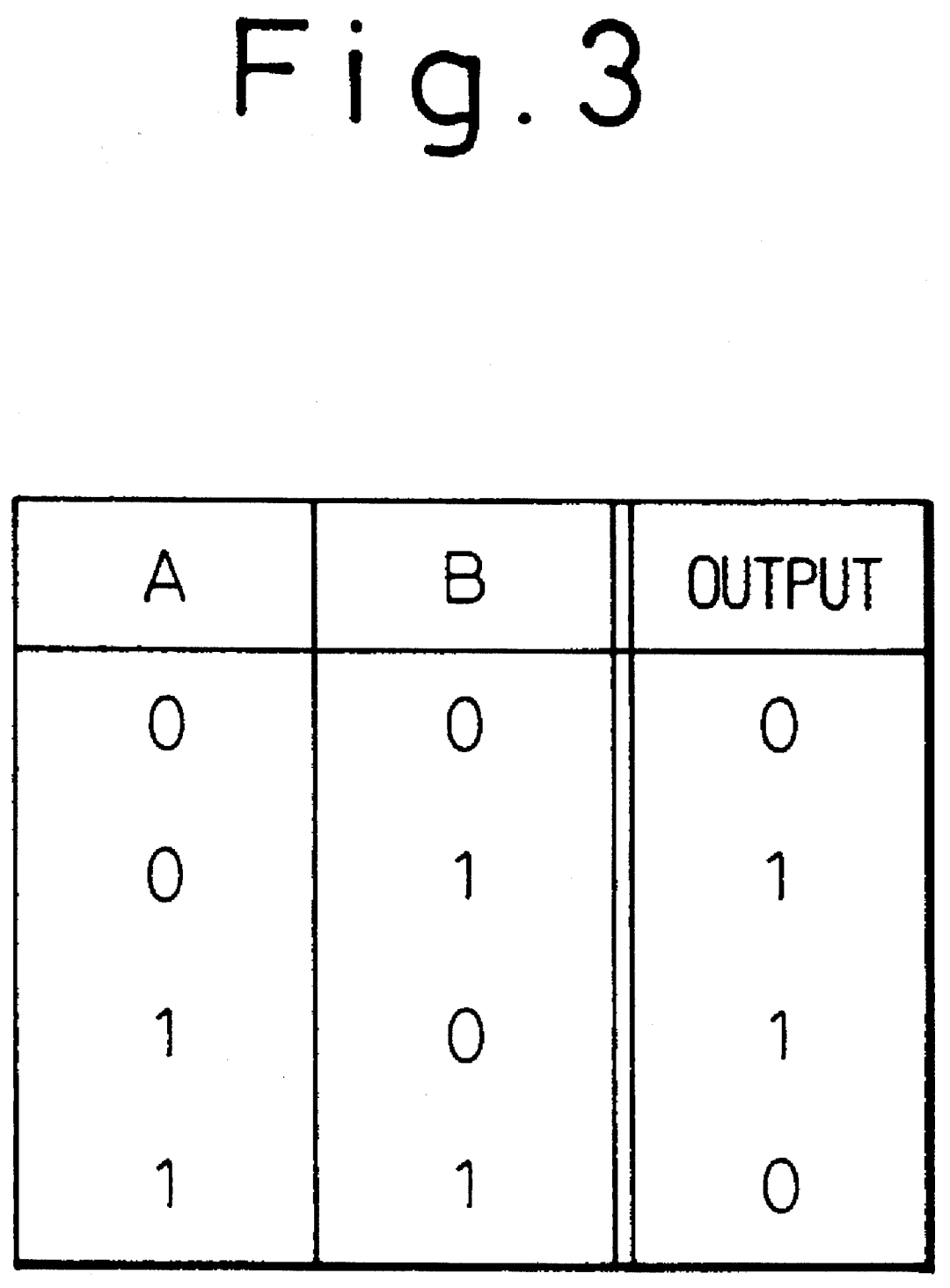

FIG. 3 is a table showing the truth values for the operation of the XOR in the relay activator. As shown, the output of the XOR is "1" when one or other of the outputs A, B of the preamble signal detectors 31, 32 is "1" and the other is "0", and the output of the XOR is "0" when both outputs A and B are "0" or "1".

The operation of the transmission path coupling equipment can be summarized as follows:

i) When no signals are present on the transmission paths and no transmission is made from M-SV or S-SV, the relay is OFF and, therefore, M-SV or S-SV is isolated from the transmission paths.

ii) With no signals present on the transmission paths, if a transmission is attempted from M-SV or S-SV, the relay is turned on, so that M-SV or S-SV is connected to the transmission paths, thus entering a transmit mode.

iii) With a signal present on the transmission paths, if no transmission is made from M-SV or S-SV, then the relay is turned on, and M-SV or S-SV is connected to the transmission paths, thus entering a receive mode.

iv) With a signal present on the transmission paths, if a transmission is attempted from M-SV or S-SV, the relay is turned off to disconnect M-SV or S-SV from the transmission paths, thus avoiding a collision of signals on the transmission paths.

Figure 4:
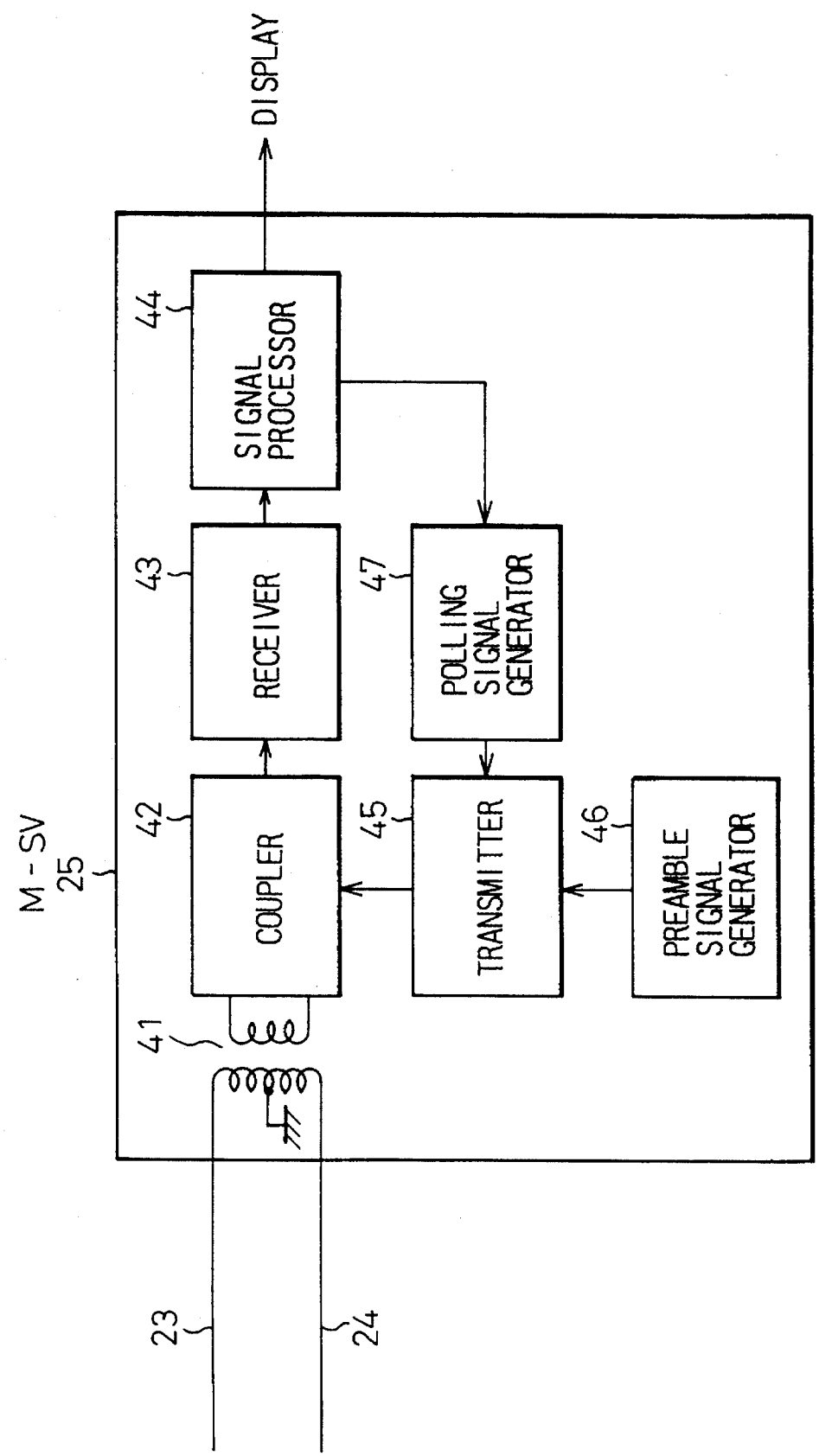
FIG. 4 is a block diagram showing the configuration of master supervisory equipment in the embodiment shown in FIG. 1.

FIG. 4 is a diagram showing the configuration of the master supervisory equipment in the embodiment shown in FIG. 1; the same parts as those shown in FIG. 1 are designated by the same reference numerals. In the figure, the numeral 41 is an input transformer with its center tap grounded; 42 is a coupler for coupling and decoupling received and transmitted signals; 43 is a receiver for receiving a signal from slave supervisory equipment; and 44 is a signal processor for processing the received signal. Further, the numeral 45 is a transmitter for transmitting a signal to slave supervisory equipment; 46 is a preamble signal generator for generating a preamble signal; and 47 is a polling signal generator for generating a polling signal.

In reception, the signal transmitted from S-SV, via the balanced line consisting of the positive-polarity transmission path 23 and negative-polarity transmission path 24, is converted by the transformer 41 into a unipolar signal on an unbalanced line which is then fed, via the coupler 42, to the receiver 43 for decoding and then on to the signal processor 44, where prescribed signal processing is performed to produce an alarm display.

In transmission, the preamble signal generator 46 generates a preamble signal which is fed to the transmitter 45 which then supplies this signal to the transformer 41 via the coupler 42. The transformer 41 converts the preamble signal into a signal for transmission over the positive-polarity transmission path 23 and negative-polarity transmission path 24. The polling signal generator 47 generates a coded signal necessary for polling, and transmits it via the transmitter 45 in like manner.

Figure 5:
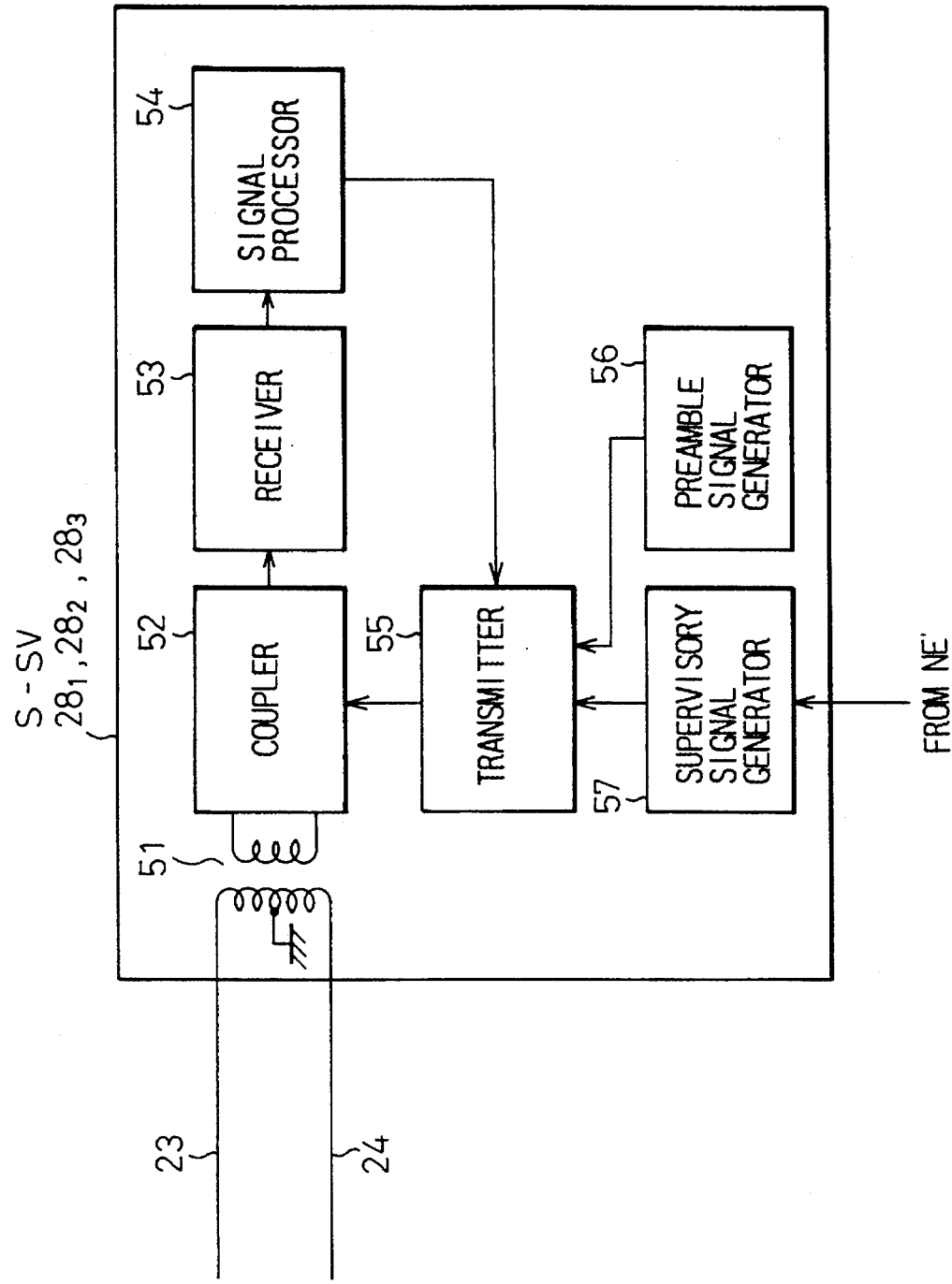
FIG. 5 is a block diagram showing the configuration of slave supervisory equipment in the embodiment shown in FIG. 1.

FIG. 5 is a diagram showing the configuration of each slave supervisory equipment in the embodiment shown in FIG. 1; the same parts as those shown in FIG. 1 are designated by the same reference numerals. In the figure, the numeral 51 is an input transformer having a center tap; 52 is a coupler for coupling and decoupling received and transmitted signals; 53 is a receiver for receiving a signal from the master supervisory equipment; and 54 is a signal processor for processing the received signal. Further, the numeral 55 is a transmitter for transmitting a signal to the master supervisory equipment; 56 is a preamble signal generator for generating a preamble signal; and 57 is a supervisory signal generator for generating a supervisory signal.

In reception, the polling signal transmitted from M-SV via the positive-polarity transmission path 23 and negative-polarity transmission path 24 is converted by the transformer 51 into a signal on an unbalanced line, which is then fed via the coupler 52 to the receiver 53 for decoding and then on to the signal processor 55, where prescribed signal processing is performed, to direct the transmitter 55 to produce a necessary response.

In transmission, the preamble signal generator 56 generates a preamble signal which is fed to the transmitter 55 which then supplies this signal to the transformer 51 via the coupler 52. The transformer 51 converts the preamble signal into a signal for transmission over the balanced line consisting of the positive-polarity transmission path 23 and negative-polarity transmission path 24. The supervisory signal generator 57 generates a prescribed supervisory signal in the event of the occurrence of an alarm condition in the associated network element (NE), and transmits the alarm via the transmitter 55 in like manner.

The following describes an alarm detection procedure according to the remote supervisory method of the present invention for the remote supervisory system depicted in FIG. 1.

i) Suppose here that the NE $29_{22}$ at the slave station $22_2$ has gone faulty, resulting in the generation of an alarm.

ii) Upon recognizing the alarm condition of the NE $29_{22}$, the S-SV $28_2$ at the slave station $22_2$ sends a supervisory signal to the M-SV 25 at the master station 21.

Thus, according to the present invention, since the occurrence of an alarm at the S-SV $28_2$ can be detected by the M-SV 25 without having to issue a send request from the M-SV 25 to the S-SV $28_2$, the time delay until the detection of an alarm by the M-SV 25 can be reduced significantly.

In the above case, the S-SV $28_2$ at the slave station $22_2$ is allowed to place the supervisory signal onto the transmission path only when signals from the master station or other slave station are not present on the transmission path. This is to avoid a collision of signals on the transmission path. As previously described, when signals from the master station or other slave station are not present on the transmission path, the transmission path coupling equipment $27_2$ operates to close the relay contacts $34_1$, $34_2$, thus allowing the transmission of the supervisory signal from the S-SV $28_2$.

Likewise, the master station 21 is allowed to send out a polling signal when signals from any slave station are not present on the transmission path; the function of a send request from M-SV to S-SV, as in the prior art remote supervisory system, is thus achieved.

Figure 6:
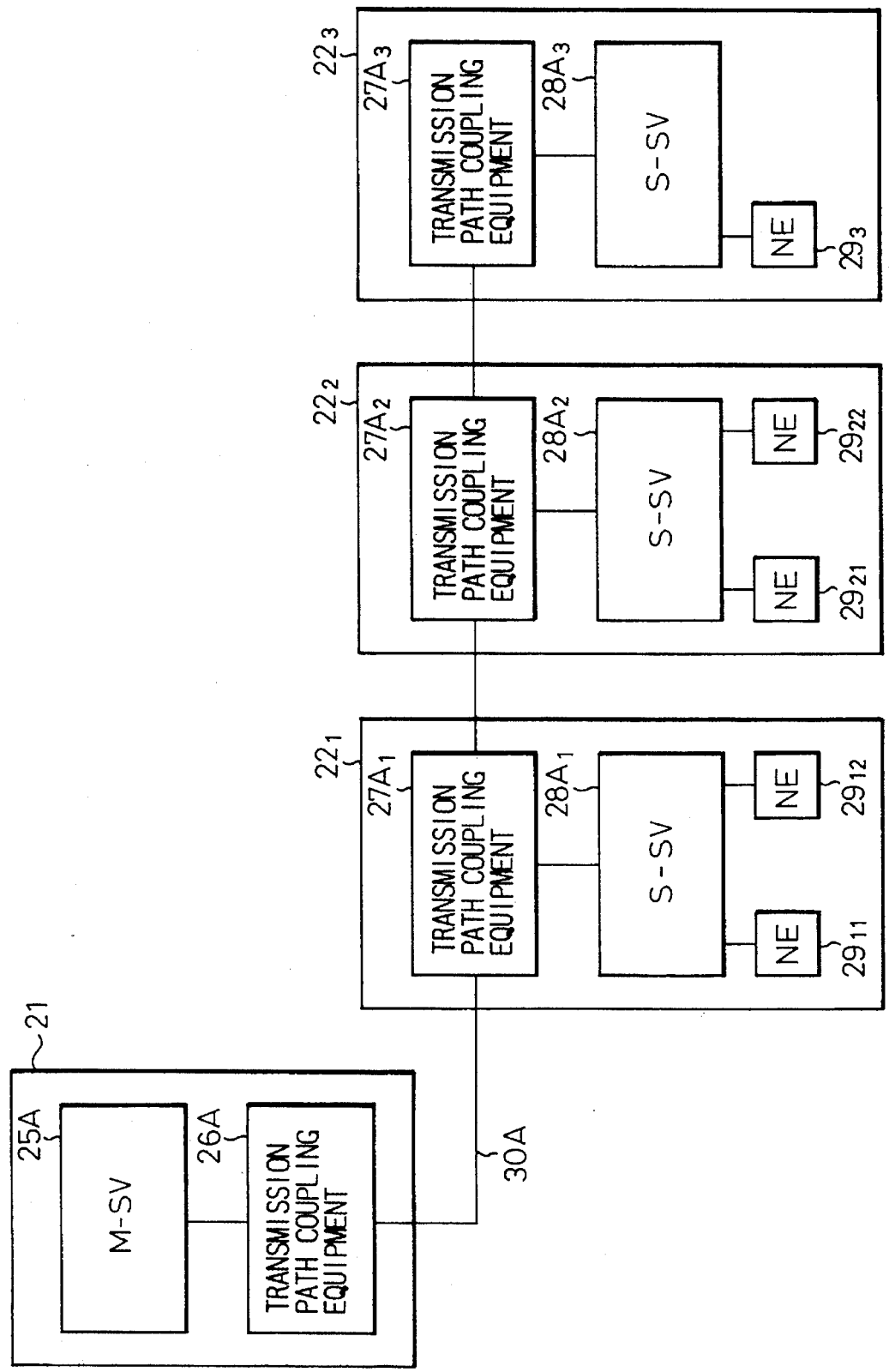
FIG. 6 is a block diagram showing an overall configuration of another embodiment of the present invention.

FIG. 6 shows an overall configuration of another embodiment of the present invention, wherein the M-SV and S-SV for supervising the NEs forming the network are coupled together by an SV signal transmitted as overhead bits via an optical transmission path that forms part of the network together with the NEs. In FIG. 6, wherein the same parts as those shown in FIG. 1 are designated by the same reference numerals, the numeral 25A is master supervisory equipment (M-SV), the numerals 26A, $27A_1$, $27A_2$, and $27A_3$ are transmission path coupling equipment, the numerals $28A_1$, $28A_2$, and $28A_3$ are slave supervisory equipment (S-SV), and the numeral 30A is the optical transmission path. The M-SV 25A, the transmission path coupling equipment, 26A, $27A_1$, $27A_2$, $27A_3$, and the S-SVs, $28A_1$, $28A_2$, $28A_3$, respectively serve the same functions as the M-SV 25, the transmission path coupling equipment, 26, $27_1$, $27_2$, $27_3$, and the S-SVs, $28_1$, $28_2$, $28_3$, described in the embodiment of FIG. 1, but are somewhat different in configuration.

Figure 7:
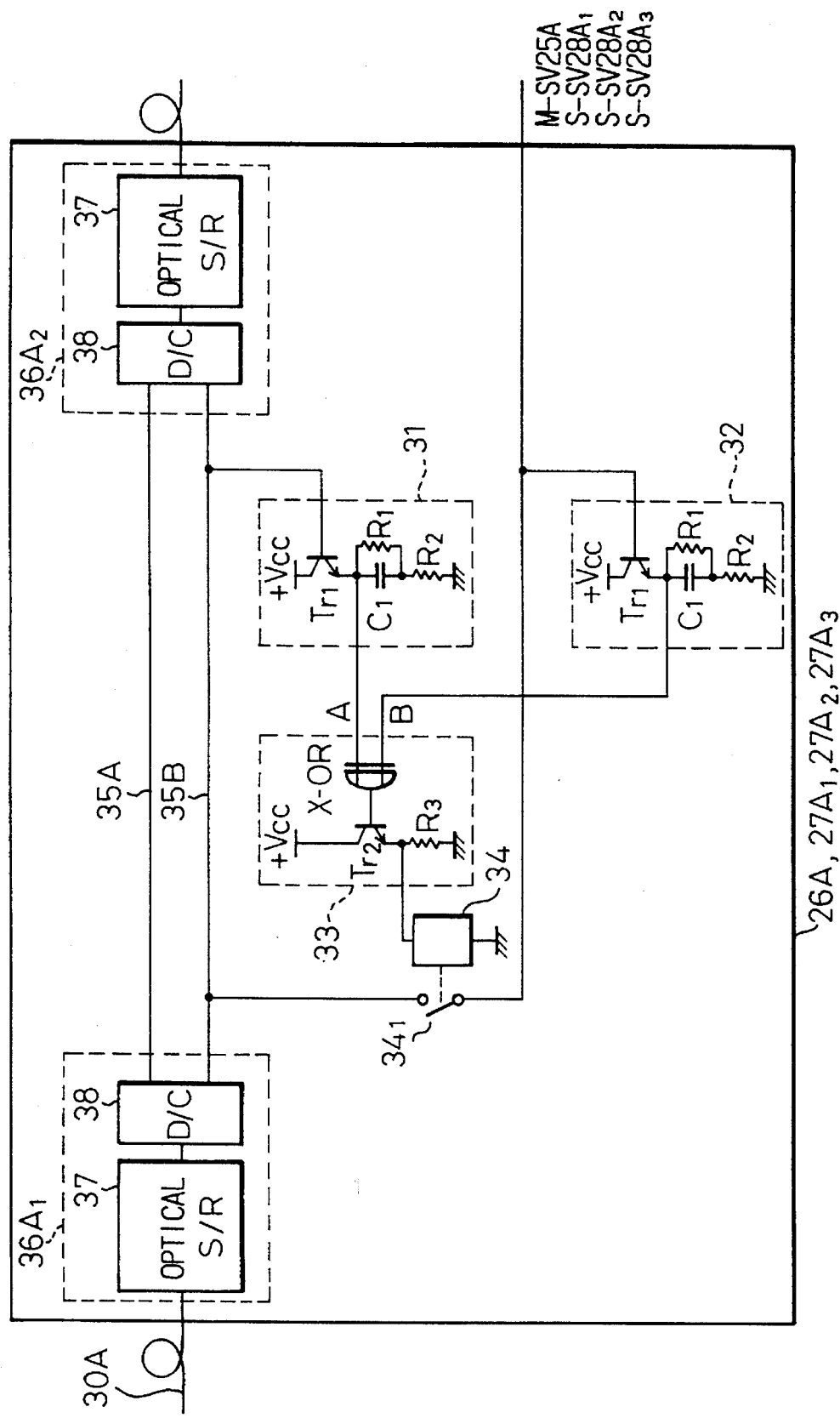
FIG. 7 is a circuit block diagram showing the configuration of transmission path coupling equipment in the embodiment shown in FIG. 6.

FIG. 7 is a diagram showing the configuration of each transmission path coupling equipment in the embodiment shown in FIG. 6; the same parts as those shown in FIGS. 2 and 6 are designated by the same reference numerals. The numerals 35A and 35B indicate a transmission path, such as a telephone line, and an SV signal transmission path, respectively. The numerals $36A_1$ and $36A_2$ are optical transmission terminals, where optical signals are terminated. Each terminal comprises an optical transmitter/receiver (optical S/R) 37 and a decoupler/coupler (D/C) 38.

In each of the optical transmission terminals $36A_1$ and $36A_2$, the optical S/R 37 performs conversion between an optical signal on the optical transmission path 30A and an electrical signal on the D/C 38 side. The D/C 38 couples and decouples the electrical signal to and from telephone line or other transmission information for connection with the telephone line or other transmission path 35A, and also couples and decouples overhead bits for connection with the SV signal transmission path 35B. SV signals include an alarm signal, a polling signal, and other control signals.

Thus, in the receive mode, the alarm signal or the polling signal transmitted over the optical transmission path 30A is received by the M-SV 25A or the S-SV, $28A_1$, $28A_2$, $28A_3$. On the other hand, in the transmit mode, the polling signal or the alarm signal is sent out onto the optical transmission path 30A from the M-SV 25A or the S-SV, $28A_1$, $28A_2$, $28A_3$.

Figure 8:
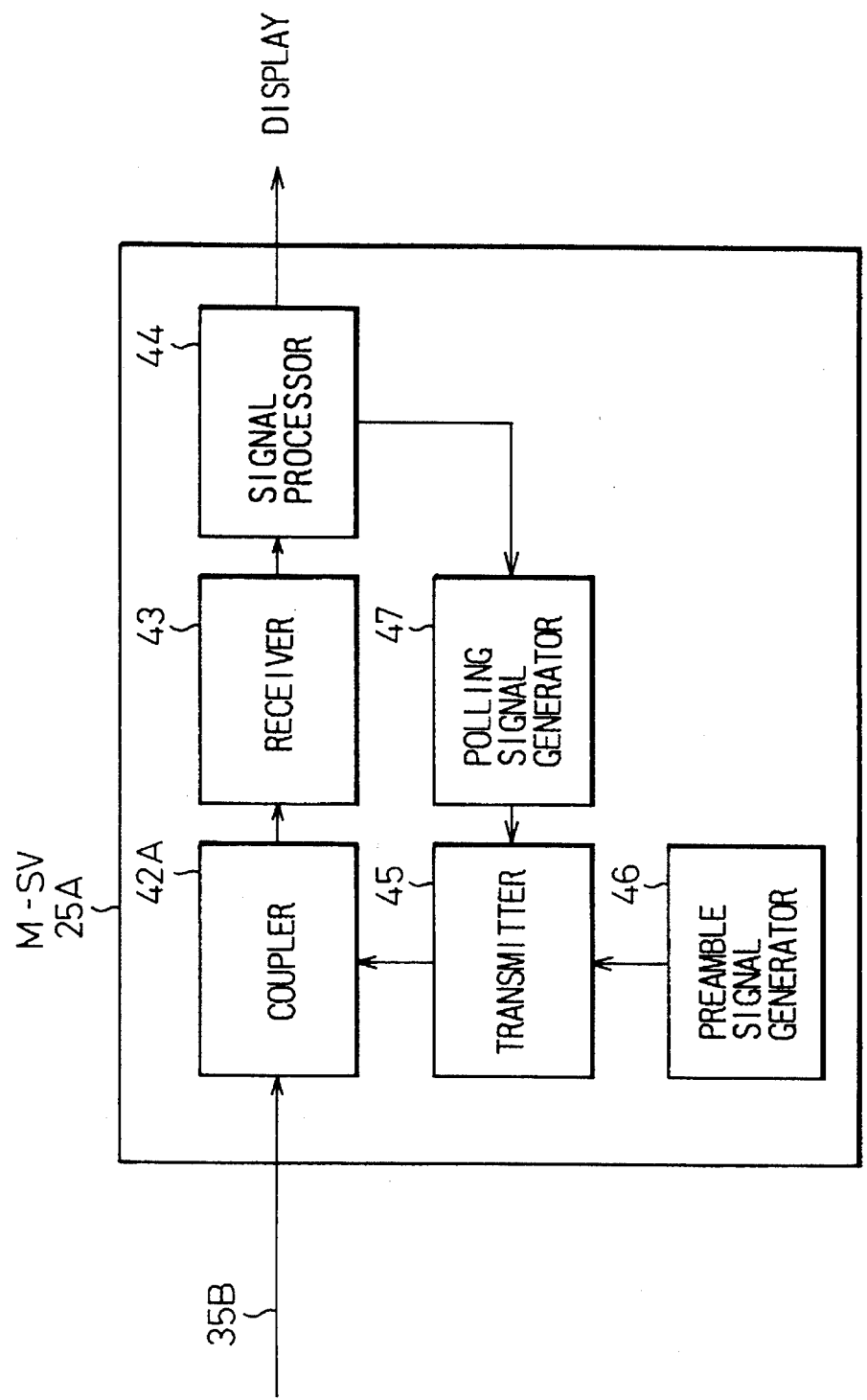
FIG. 8 is a block diagram showing the configuration of master supervisory equipment in the embodiment shown in FIG. 6.

FIG. 8 is a diagram showing the configuration of the master supervisory equipment in the embodiment shown in FIG. 6. In FIG. 8, wherein the same parts as those shown in FIG. 4 are designated by the same reference numerals, the numeral 42A is a coupler for coupling and decoupling received and transmitted signals.

In reception, the coupler 42A decouples an alarm signal from the SV signal transmitted over the SV signal transmission path 35B, and supplies the alarm signal to the receiver 43. In transmission, the coupler 42A couples a preamble signal or a polling signal fed from the transmitter 45 to the SV signal for transmission over the SV signal transmission path 35B.

Figure 9:
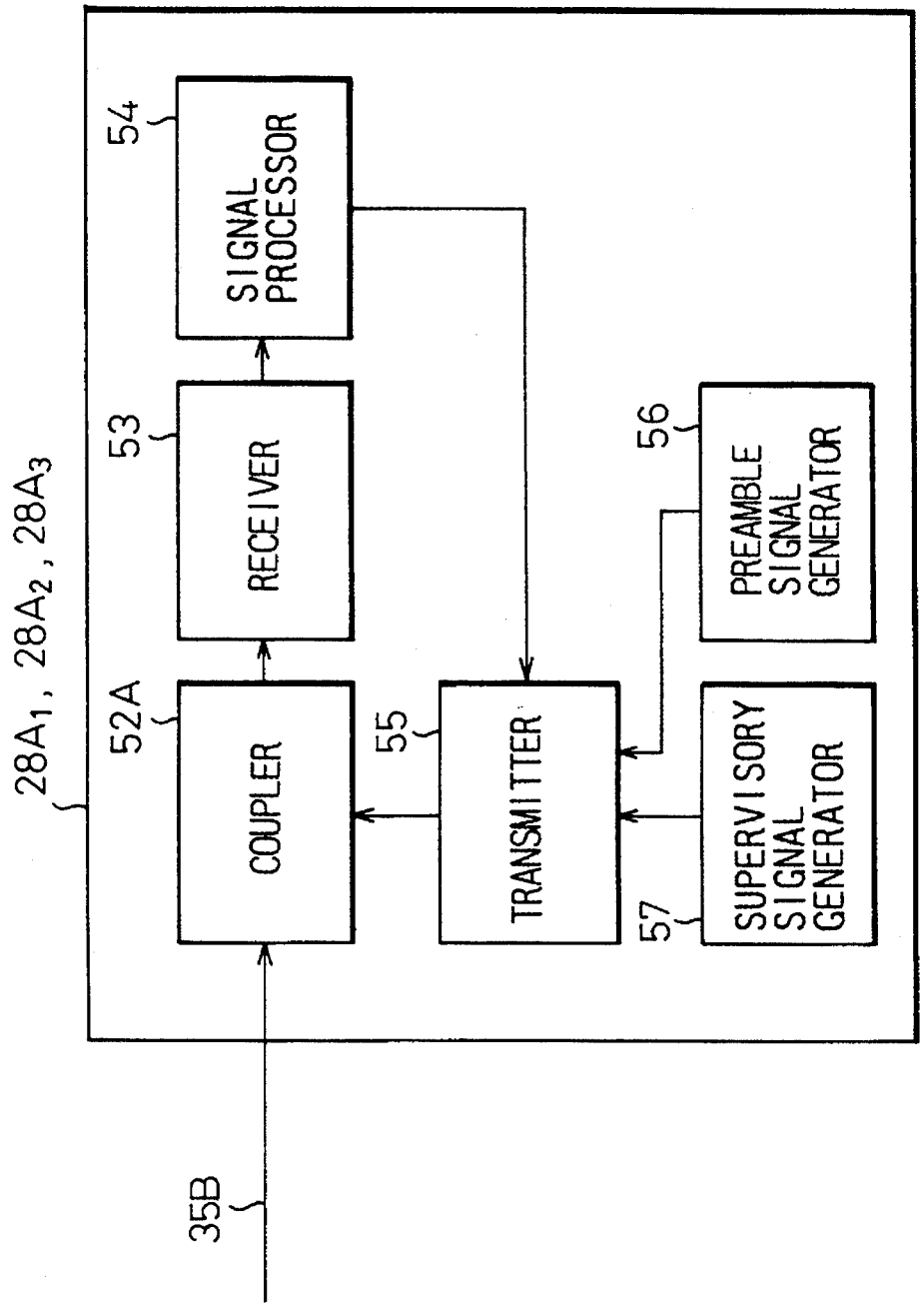
FIG. 9 is a block diagram showing the configuration of slave supervisory equipment in the embodiment shown in FIG. 6.

FIG. 9 is a diagram showing the configuration of each slave supervisory equipment in the embodiment shown in FIG. 6. In FIG. 9, wherein the same parts as those shown in FIG. 6 are designated by the same reference numerals, the numeral 52A is a coupler for coupling and decoupling received and transmitted signals.

In reception, the coupler 52A decouples a polling signal from the SV signal transmitted over the SV signal transmission path 35B, and supplies the polling signal to the receiver 53. In transmission, the coupler 52A couples a preamble signal or an alarm signal fed from the transmitter 55 to the SV signal for transmission over the SV signal transmission path 35B.

The alarm detection procedure according to the remote supervisory method of the present invention is the same for the remote supervisory system shown in FIG. 6 as for the embodiment shown in FIG. 1. Therefore, according to the present embodiment, since an alarm that has occurred at the NE $29_{22}$ monitored by the S-SV $28A_2$ can be detected by the M-SV 25A without having to issue a send request from the M-SV 25A to the S-SV $28A_2$, the time delay until the detection of an alarm by the M-SV 25A can be reduced significantly.

Figure 10:
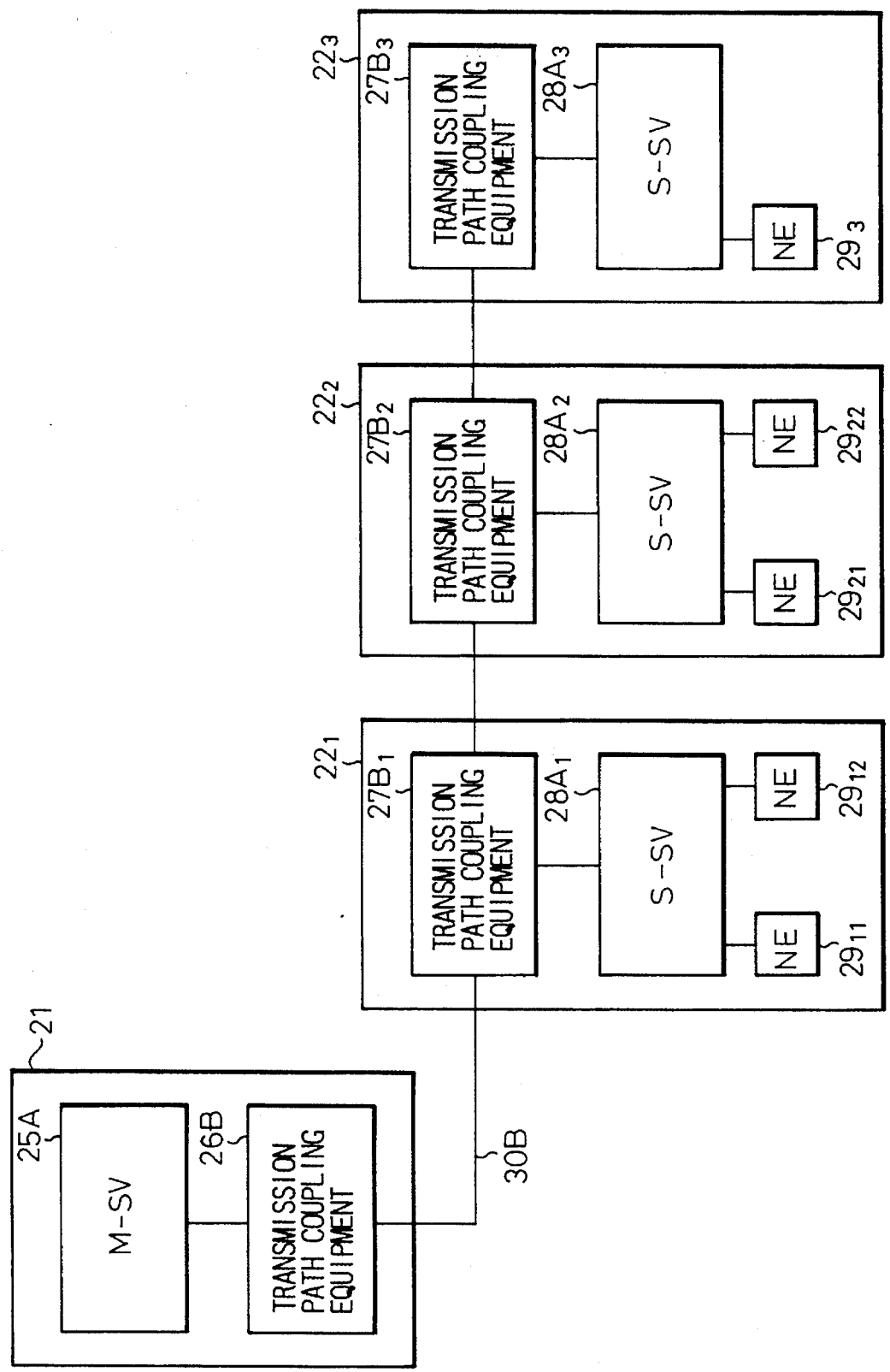
FIG. 10 is a block diagram showing an overall configuration of another embodiment of the present invention.

FIG. 10 shows an overall configuration of another embodiment of the present invention, wherein the M-SV and S-SV for supervising the NEs forming the network are coupled together by an SV signal transmitted as overhead bits via a radio transmission path that forms part of the network together with the NEs. In FIG. 10, wherein the same parts as those shown in FIG. 6 are designated by the same reference numerals, the numerals 26B, $27B_1$, $27B_2$, and $27B_3$ designate transmission path coupling equipment. The transmission path coupling equipment, 26B, $27B_1$, $27B_2$, and $27B_3$, serves the same functions as the transmission path coupling equipment 26A, $27A_1$, $27A_2$, and $27A_3$ in the embodiment shown in FIG. 6, but they are somewhat different in configuration. The master supervisory equipment (M-SV) 25A and the slave supervisory equipment (S-SV), $28A_1$, $28A_2$, $28A_3$, are the same as those described in the embodiment of FIG. 6.

Figure 11:
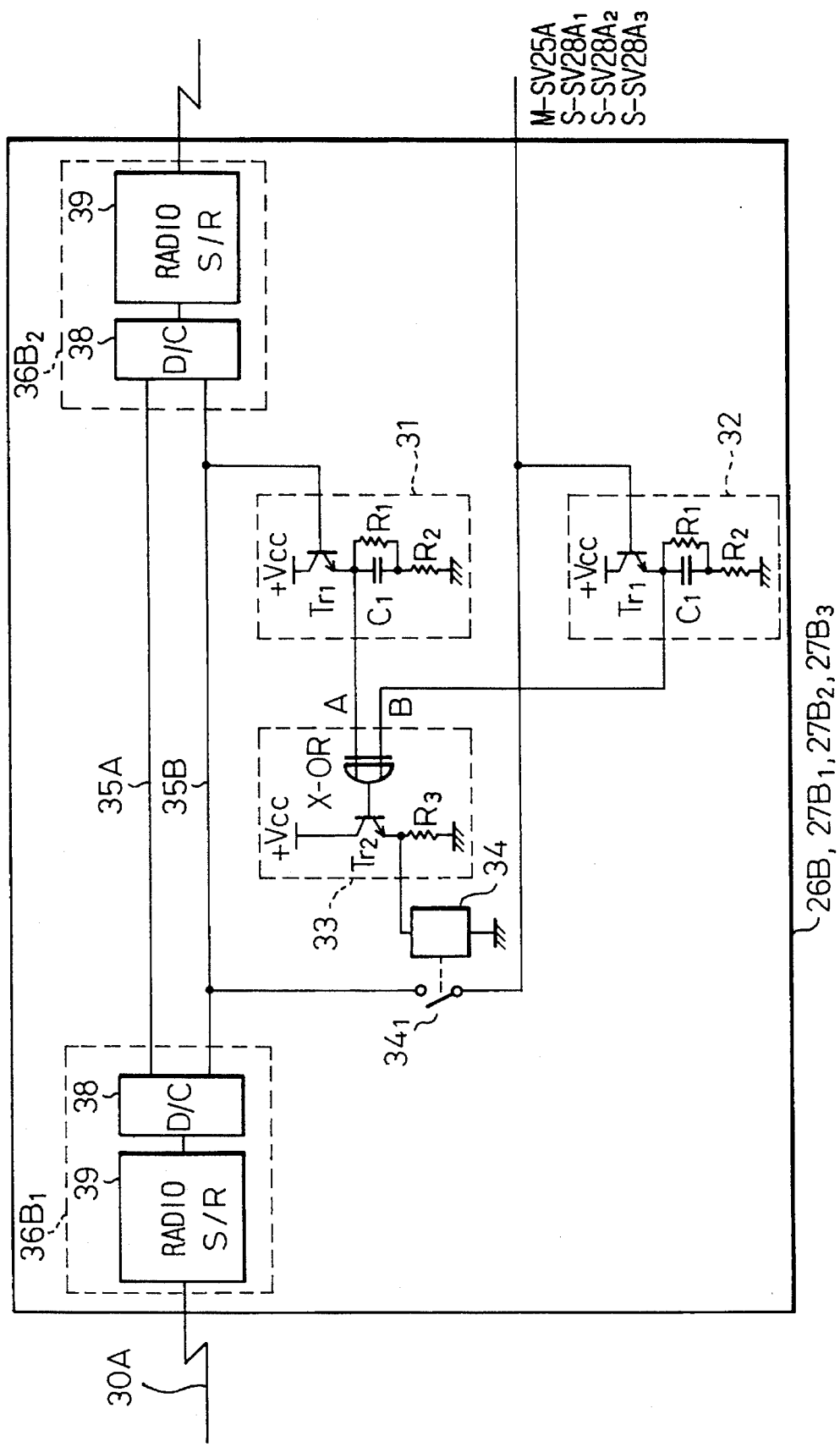
FIG. 11 is a circuit block diagram showing the configuration of transmission path coupling equipment in the embodiment shown in FIG. 10.

FIG. 11 is a diagram showing the configuration of each transmission path coupling equipment in the embodiment shown in FIG. 10; the same parts as those shown in FIGS. 7 and 10 are designated by the same reference numerals. The numerals $36B_1$ and $36B_2$ are radio transmission terminals, where radio signals are terminated. Each radio transmission terminal comprises a decoupler/coupler (D/C) 38 and a radio transmitter/receiver (radio S/R) 39. The D/C 38 is identical to that shown in FIG. 7.

In each of the radio transmission terminals $36B_1$ and $36B_2$, the radio S/R 39 performs conversion between a radio signal on the radio transmission path 30B and an electrical signal on the D/C 38 side.

In the receive mode, an alarm signal or a polling signal transmitted over the radio transmission path 30B is received by the M-SV 25A or the S-SV, $28A_1$, $28A_2$, $28A_3$. On the other hand, in the transmit mode, a polling signal or an alarm signal is sent out onto the radio transmission path 30B from the M-SV 25A or the S-SV, $28A_1$, $28A_2$, $28A_3$.

The alarm detection procedure according to the remote supervisory method of the present invention is the same for the remote supervisory system shown in FIG. 10 as for the embodiment shown in FIG. 1. Therefore, according to the present embodiment, since an alarm that has occurred at the NE $29_{22}$ monitored by the S-SV $28A_2$ can be detected by the M-SV 25A without having to issue a send request from the M-SV 25A to the S-SV $28A_2$, the time delay until the detection of an alarm by the M-SV 25A can be reduced significantly.

Figure 12:
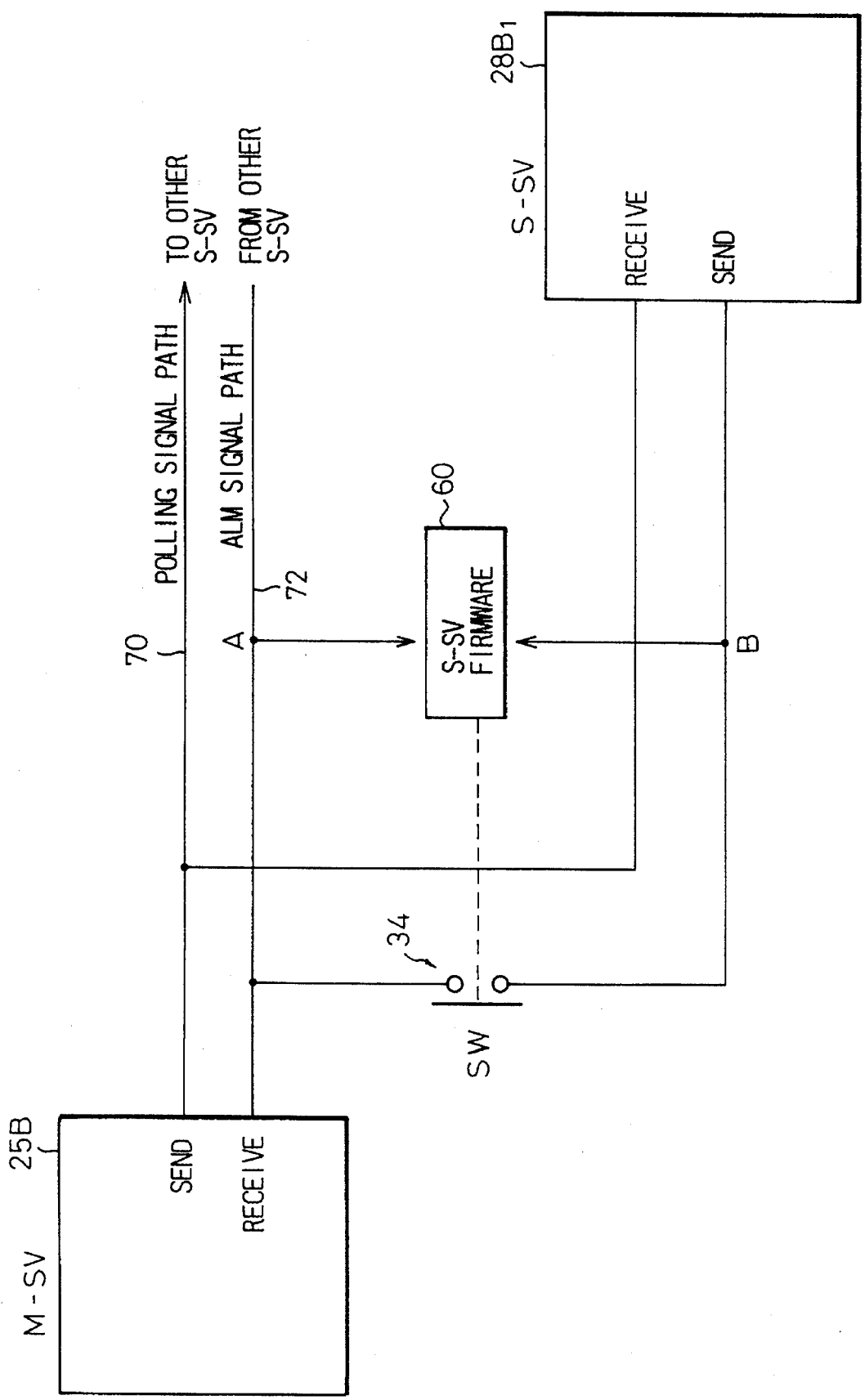
FIG. 12 is a block diagram showing the configuration of another embodiment of the present invention.

FIG. 12 is a diagram showing the configuration of another embodiment of the present invention, illustrating a two-wire electrical signal transmission system wherein the polling signal from M-SV to S-SV and the alarm signal from S-SV to M-SV are carried over separate unbalanced transmission lines. As shown, a polling signal path 70 is connected to a send terminal of an M-SV 25B, while an alarm signal path 72 is connected to a receive terminal thereof. The polling signal path 70 is also connected to a receive terminal of an S-SV $28B_1$ as well as to receive terminals of other S-SVs $28B_2$ and $28B_3$ (not shown). On the other hand, a send terminal of the S-SV $28B_1$ is connected to the alarm signal path 72 via a contact of a relay 34; send terminals of the other S-SVs $28B_2$ and $28B_3$ are also connected in the same manner. S-SV firmware 60 consists of a CPU, a ROM, and software programs held in the ROM. A signal on the alarm signal path at point A in the figure and a signal at point B on the send terminal of the S-SV $28B_1$ are input to the S-SV firmware 60, and based on these inputs, the S-SV firmware 60 controls the relay 34.

Figure 13:
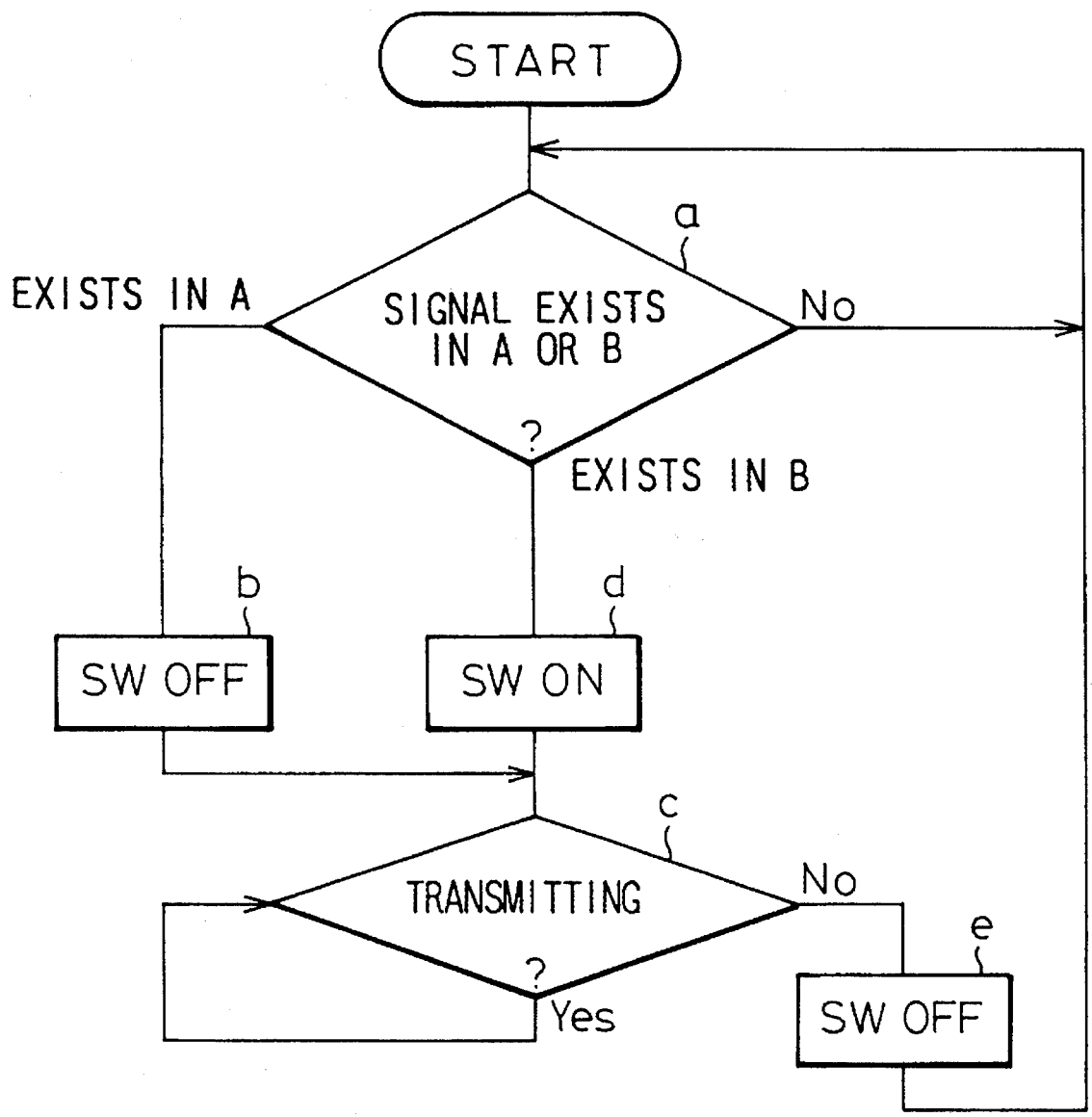
FIG. 13 is a flowchart illustrating the operation of S-SV firmware 60 in the embodiment shown in FIG. 12.

FIG. 13 is a flowchart illustrating the operation of the S-SV firmware 60. In the initial condition, the relay 34 is off. First, the presence or absence of a signal at point A or B is checked. If a signal is present at point A, that is, if an alarm signal destined for the M-SV from some other S-SV is present on the alarm signal path 72, the relay remains off (step b), and the process returns to step a after the transmission of the alarm signal is completed (step c). If a signal is present at point B, that is, if an alarm signal output from the S-SV $28B_1$ is present, then the relay 34 is turned on (step d), and after the transmission of the alarm signal is completed (step c), the relay 34 is turned off (step e) and the process returns to step a. In this way, the situation is avoided where alarm signals from different S-SVs are placed simultaneously onto the alarm signal path 72. On the other hand, the polling signal output from the M-SV can be sent to all the S-SVs any time.

Figure 14:
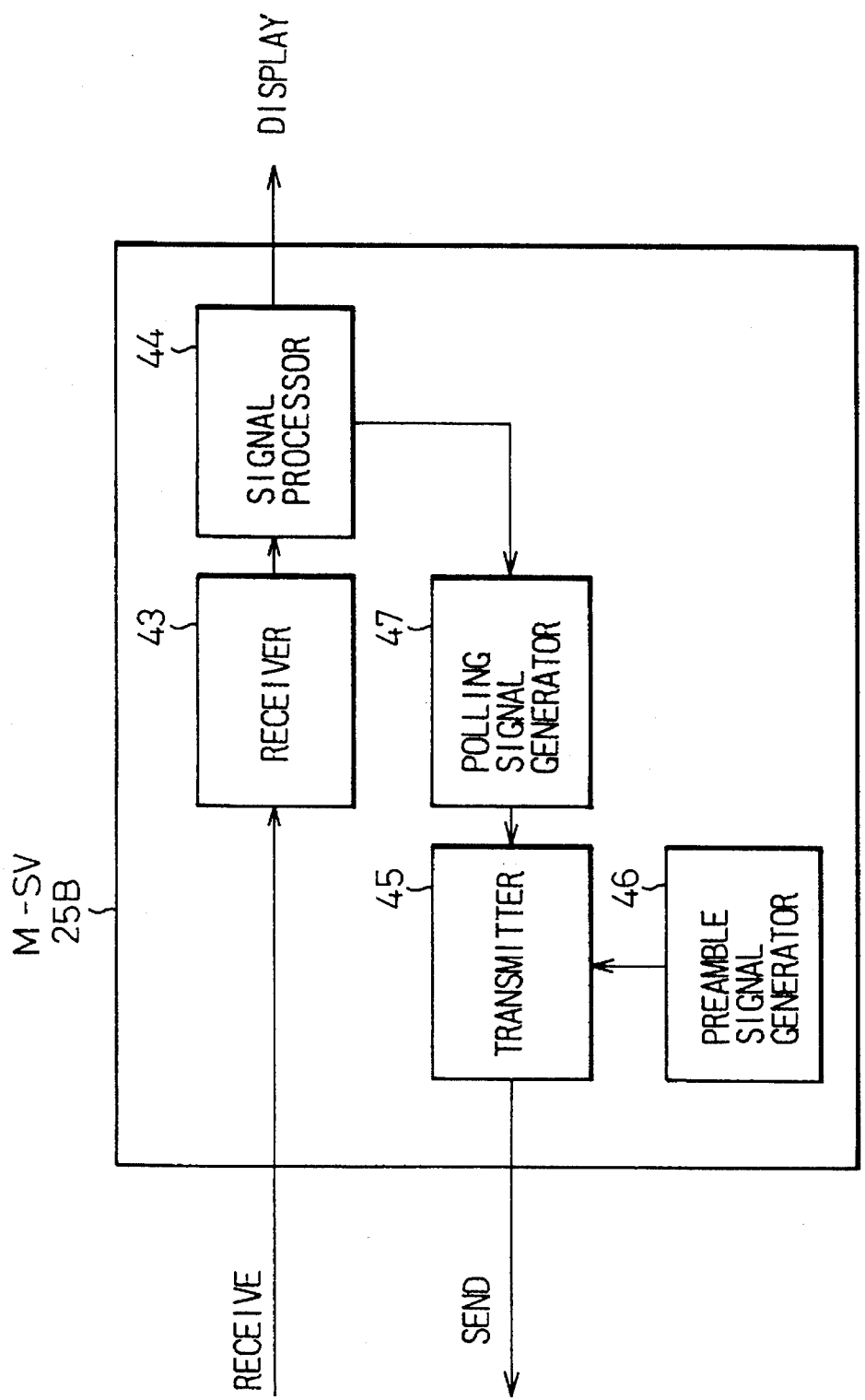
FIG. 14 is a block diagram showing the configuration of master supervisory equipment in the embodiment shown in FIG. 12.

FIG. 14 is a diagram showing the configuration of the M-SV 25B of FIG. 12. The same parts as those shown in FIG. 8 are designated by the same reference numerals.

As shown in FIG. 14, the M-SV 25B does not have the coupler 42A shown in FIG. 8.

Figure 15:
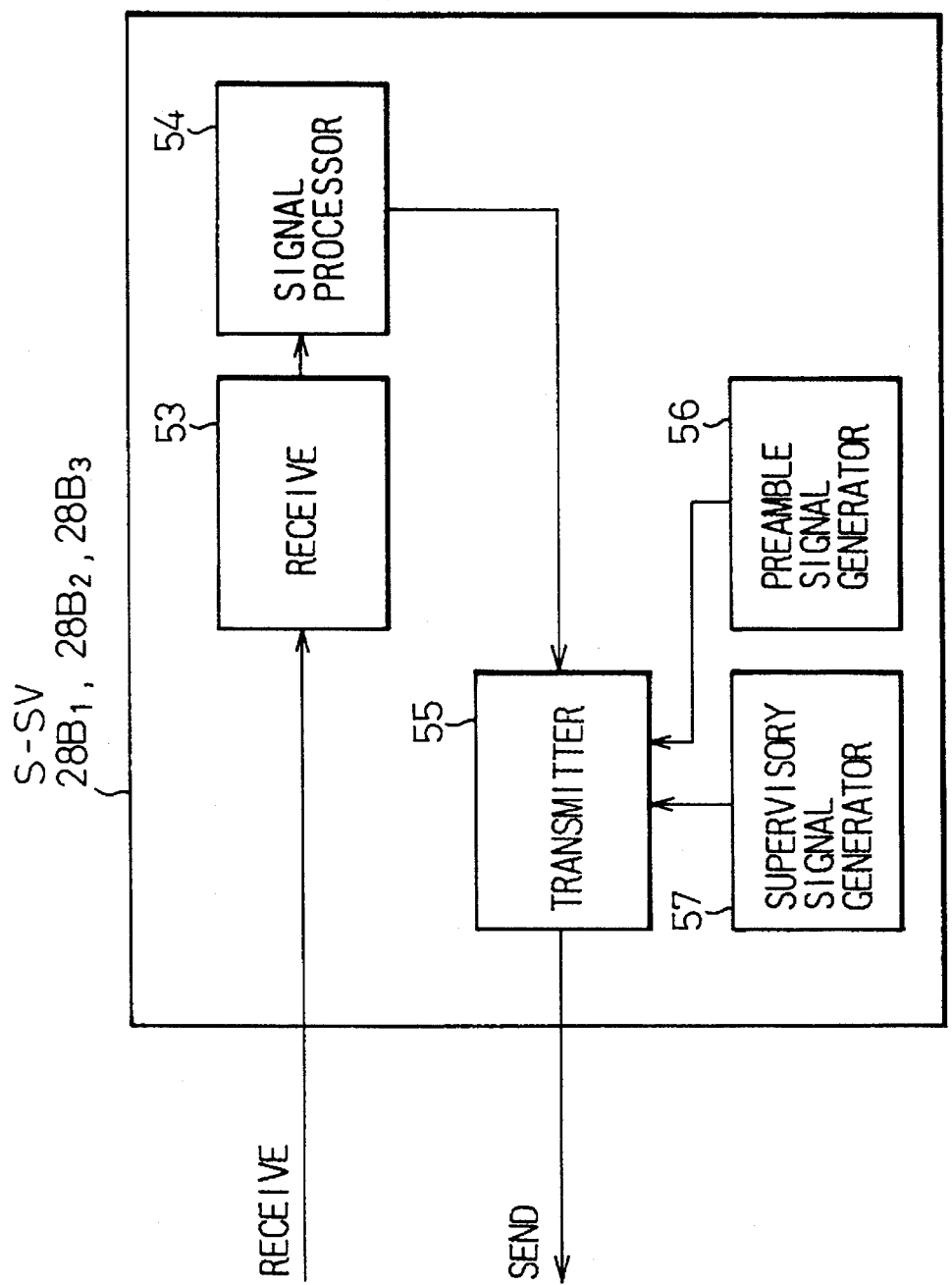
FIG. 15 is a block diagram showing the configuration of slave supervisory equipment in the embodiment shown in FIG. 12.

FIG. 15 is a diagram showing the configuration of the S-SV $28B_1$ ($28B_2$, $28B_3$) of FIG. 12. The same parts as those shown in FIG. 9 are designated by the same reference numerals. As shown in FIG. 15, the S-SV $28B_1$ does not have the coupler 52A shown in FIG. 9.

Figure 16:
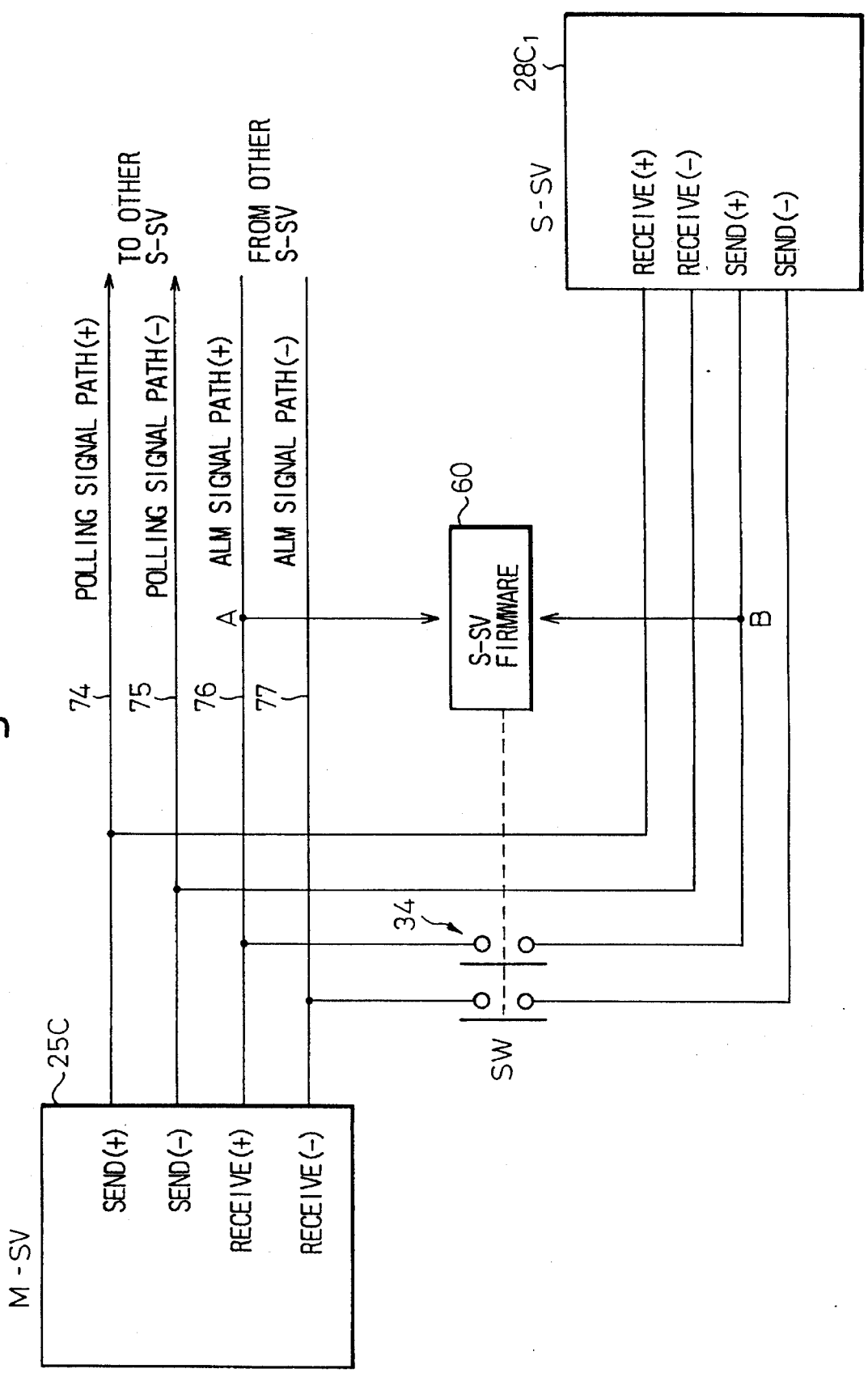
FIG. 16 is a block diagram showing the configuration of another embodiment of the present invention.

FIG. 16 is a diagram showing the configuration of another embodiment of the present invention, illustrating a four-wire electrical signal transmission system wherein the polling signal from M-SV to S-SV and the alarm signal from S-SV to M-SV are transmitted over separate balanced transmission line pairs. The same parts as those shown in FIG. 12 are designated by the same reference numerals. A positive-polarity polling signal path 74 is connected to a positive-polarity send terminal of an M-SV 25C, while a negative-polarity polling signal path 75 is connected to a negative-polarity send terminal thereof. A positive-polarity alarm signal path 76 is connected to a positive-polarity receive terminal of the M-SV 25C, while a negative-polarity alarm signal path 77 is connected to a negative-polarity receive terminal thereof. Likewise, the positive-polarity polling signal path 74 is connected to a positive-polarity receive terminal of an S-SV $28C_1$, and the negative-polarity polling signal path 75 is connected to a negative-polarity receive terminal of the S-SV $28C_1$. Further, a positive-polarity send terminal and a negative-polarity send terminal of the S-SV $28C_1$ are connected via a relay 34 to the positive-polarity alarm signal path 76 and the negative-polarity alarm signal path 77, respectively. S-SV firmware 60 monitors a signal on the positive-polarity alarm signal path 76 at point A in the figure and a signal at point B on the positive-polarity send terminal of the S-SV $28C_1$, and controls the relay 34 in accordance with the operation illustrated with reference to FIG. 13.

Figure 17:
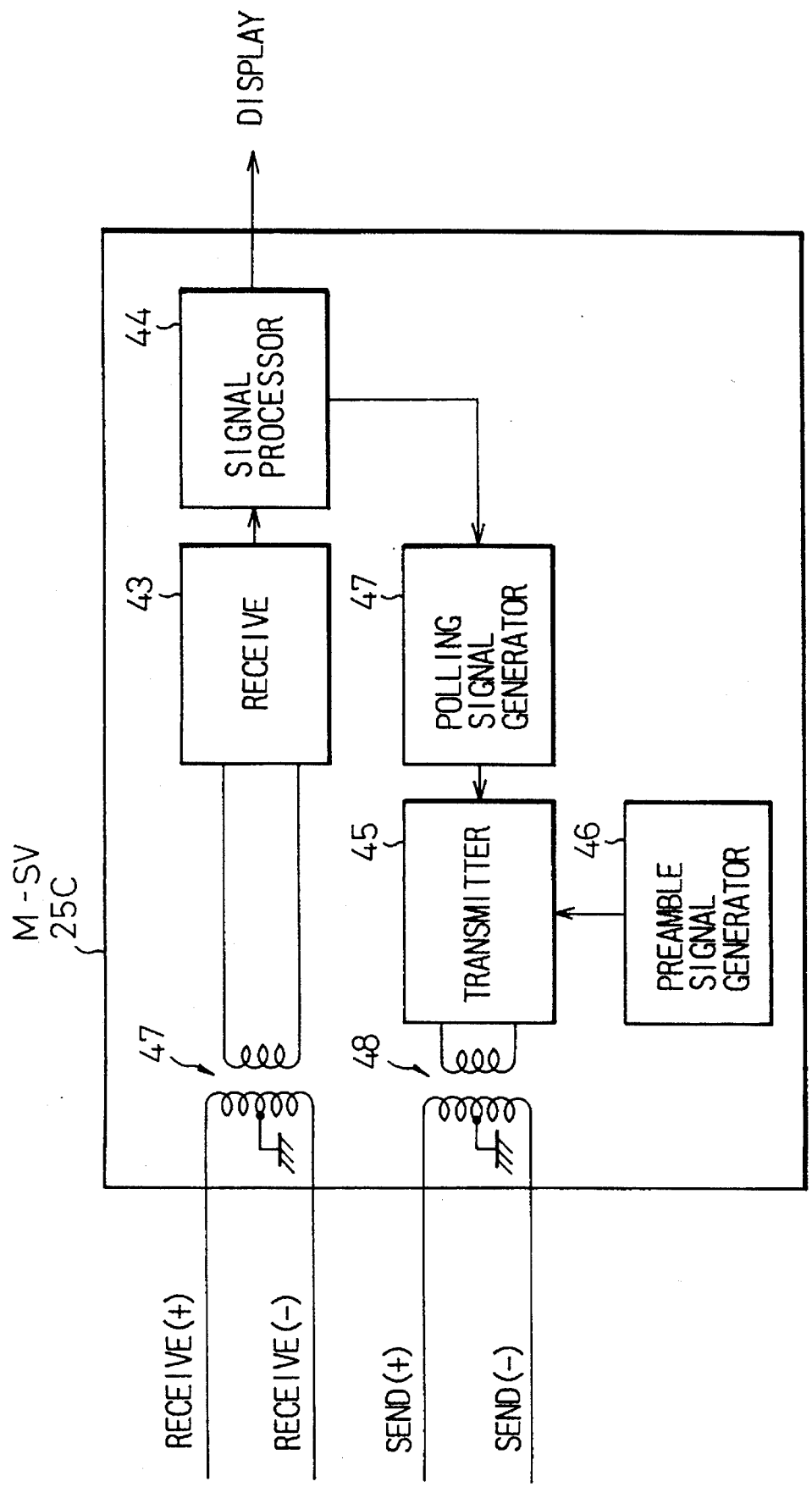
FIG. 17 is a block diagram showing the configuration of master supervisory equipment in the embodiment shown in FIG. 16.

FIG. 17 is a diagram showing the configuration of the M-SV 25C of FIG. 16. The same parts as those shown in FIG. 4 are designated by the same reference numerals. As shown in FIG. 17, the M-SV 25C does not have the coupler 42 shown in FIG. 4, and is connected to the transmission lines via a transformer 47 on the receive side and via a transformer 48 on the send side.

Figure 18:
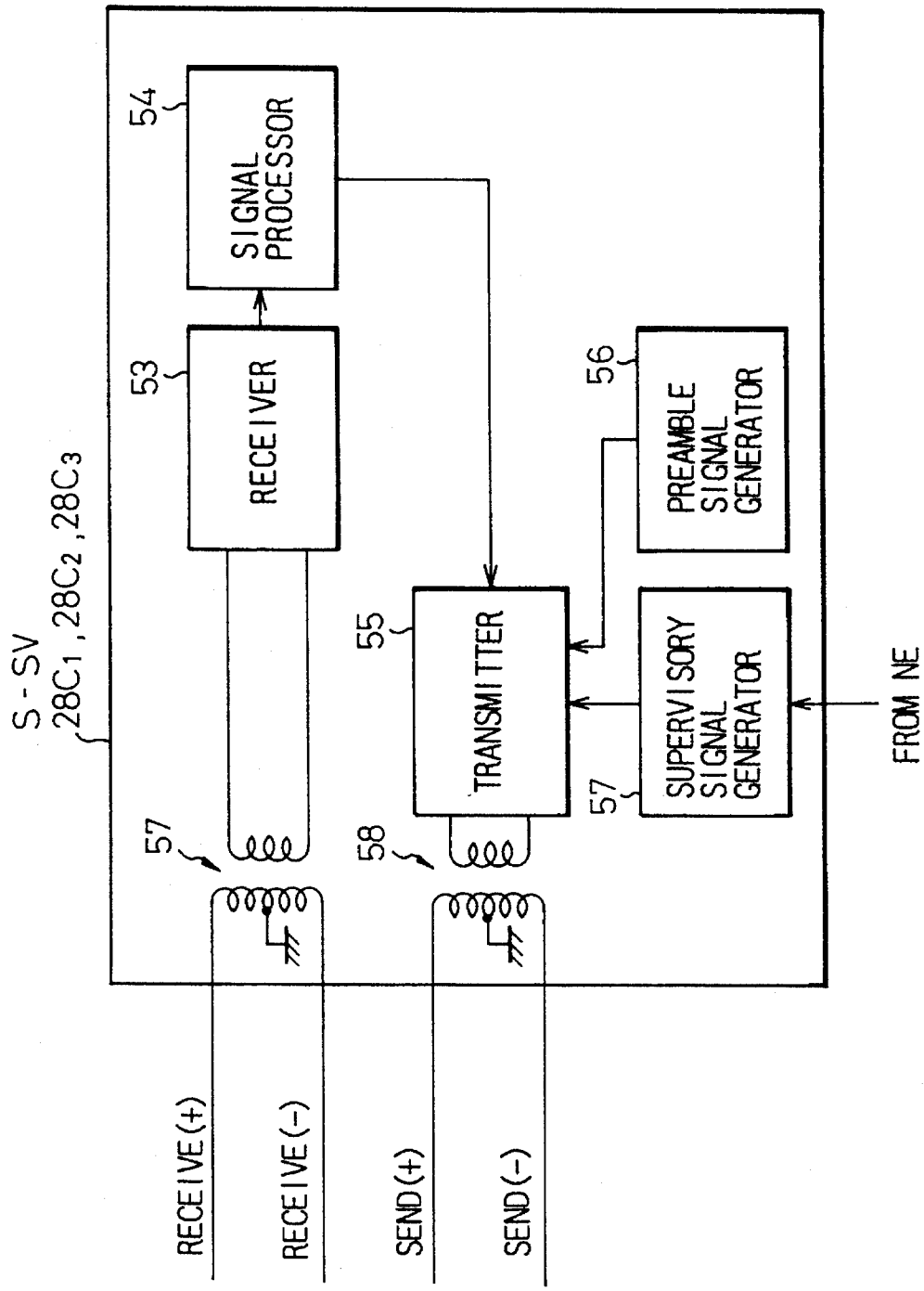
FIG. 18 is a block diagram showing the configuration of slave supervisory equipment in the embodiment shown in FIG. 16.

FIG. 18 is a diagram showing the configuration of the S-SV $28C_1$ of FIG. 16. The same parts as those shown in FIG. 5 are designated by the same reference numerals. As shown in FIG. 18, the S-SV $28C_1$ does not have the coupler 52 shown in FIG. 5, and is connected to the transmission lines via a transformer 57 on the receive side and via a transformer 58 on the send side.

Figure 19:
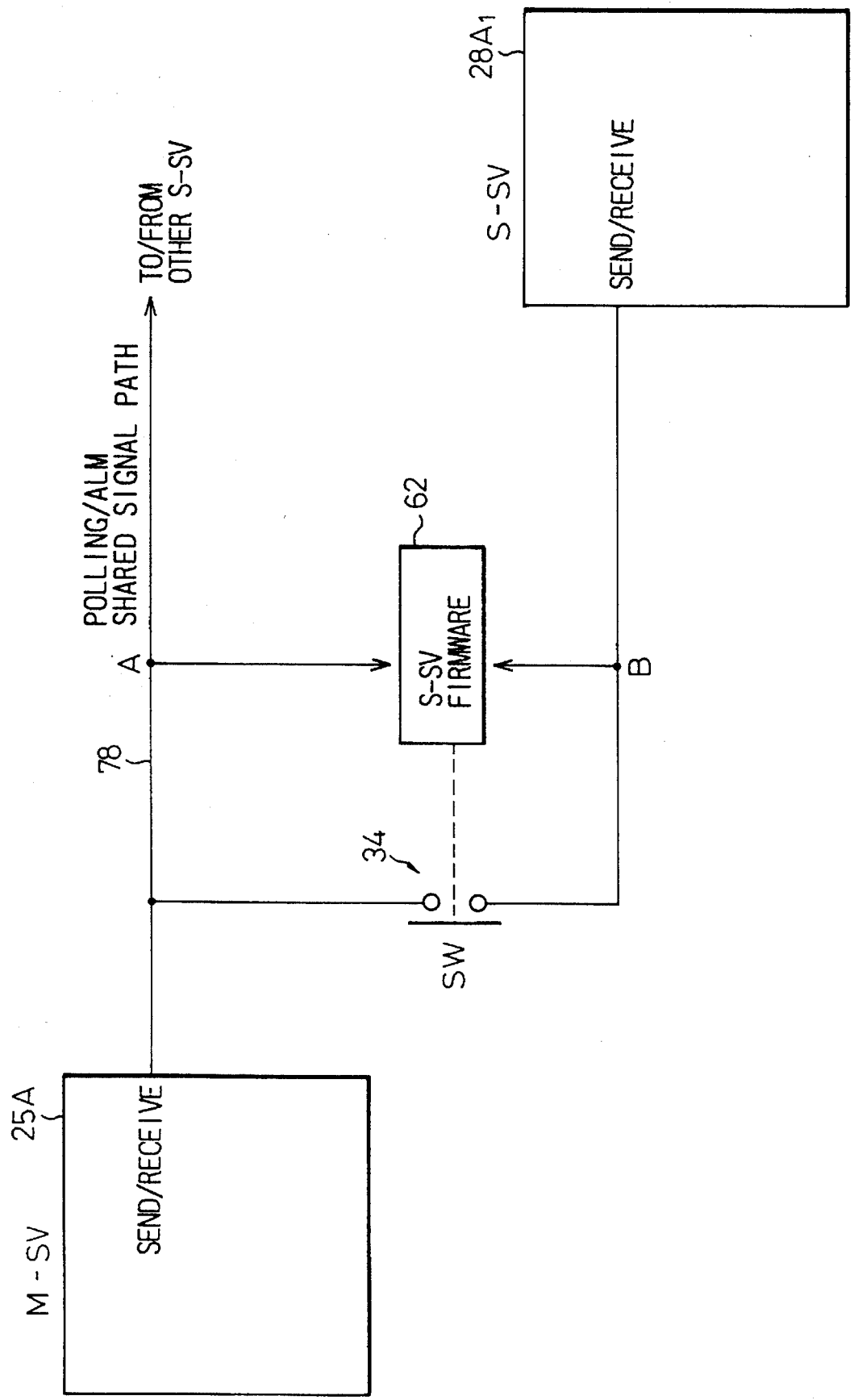
FIG. 19 is a block diagram showing the configuration of another embodiment of the present invention.

FIG. 19 is a diagram showing the configuration of another embodiment of the present invention, illustrating a common single-wire electrical signal transmission system wherein the polling signal from M-SV to S-SV and the alarm signal from S-SV to M-SV are transmitted over a common single transmission line. The M-SV 25A, described with reference to FIG. 8A, is connected to a polling/alarm shared signal path 78. The S-SV $28A_1$, described with reference to FIG. 9, is connected to the polling/alarm shared signal path 78 via a relay 34. S-SV firmware 62 consists of a CPU, a ROM, and software programs held in the ROM. A signal on the polling/alarm shared signal path 78 at point A in the figure and a signal at point B on the send/receive terminal of the S-SV $28A_1$ are input to the S-SV firmware 62, and based on these inputs, the S-SV firmware 62 controls the relay 34.

Figure 20:
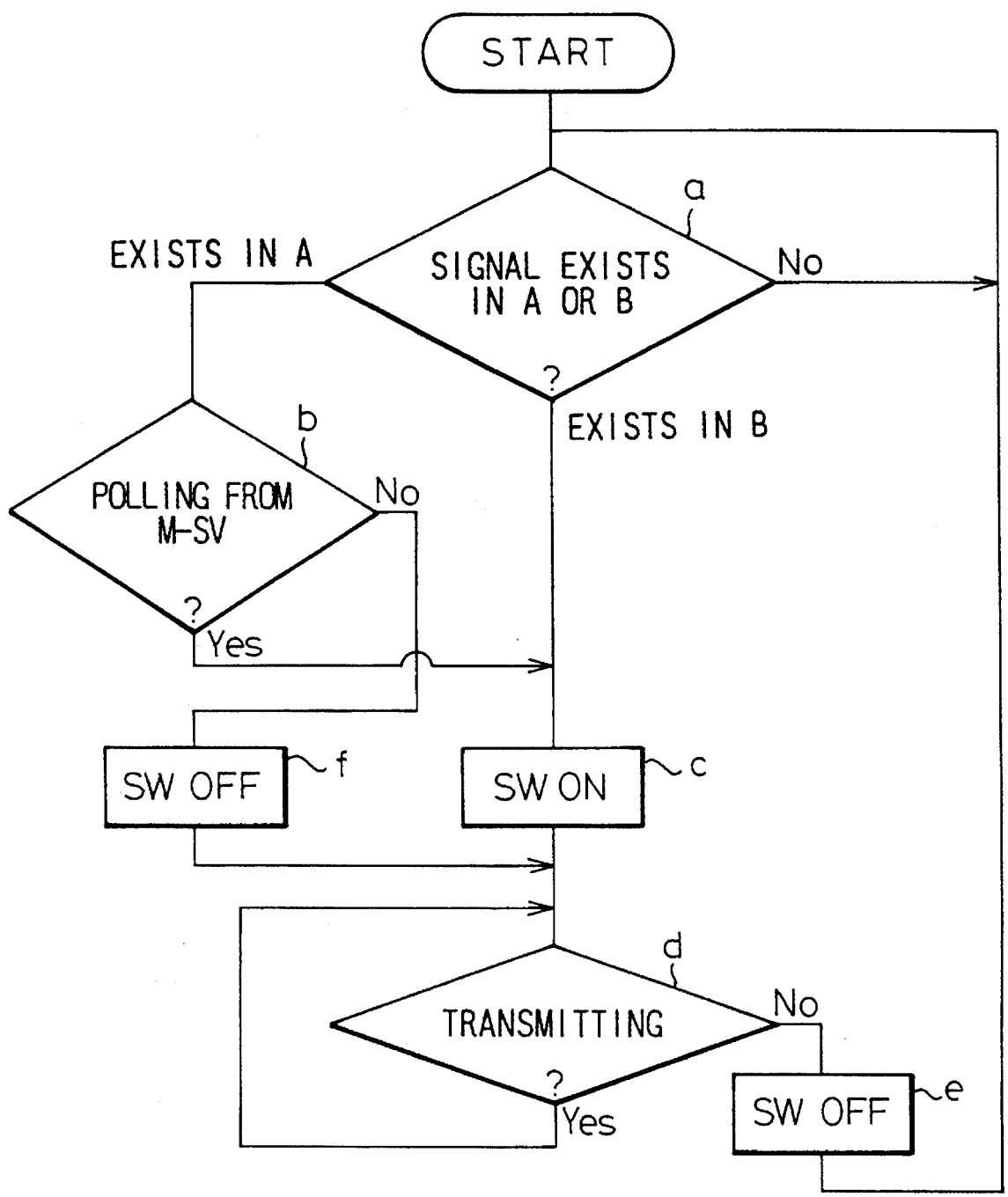
FIG. 20 is a flowchart illustrating the operation of S-SV firmware 62 in the embodiment shown in FIG. 19.

FIG. 20 is a flowchart illustrating the operation of the S-SV firmware 62. In the initial condition, the relay 34 is off. First, the presence or absence of a signal at point A or B is checked (step a). If a signal is present at point A, then a decision is made as to whether the signal is a polling signal or not (step b). If it is a polling signal, the relay 34 is turned on (step c), and after the transmission of the polling signal is completed (step d), the relay 34 is turned off and the process returns to step a. If the signal at point A is not a polling signal, that is, if it is an alarm signal from some other S-SV, the relay 34 remains off (step f), and the process returns to step a after the transmission of the alarm signal is completed. If decision is made in step a that a signal is present at point B, that is, if the S-SV $28A_1$ is attempting to transmit an alarm signal, then the relay 34 is turned on (step c), and after the transmission of the signal is completed (step d), the relay 34 is turned off (step e), and the process returns to step a. With the above operation, when the M-SV outputs a polling signal, the polling signal can be sent out onto the polling/alarm shared signal path 78 without colliding with an alarm signal from any S-SV, and taken into each S-SV from the polling/alarm shared signal path 78. Furthermore, when one S-SV is attempting to transmit an alarm signal, the situation is avoided where the alarm signal collides with a polling signal or an alarm signal being transmitted from some other S-SV.

Figure 21:
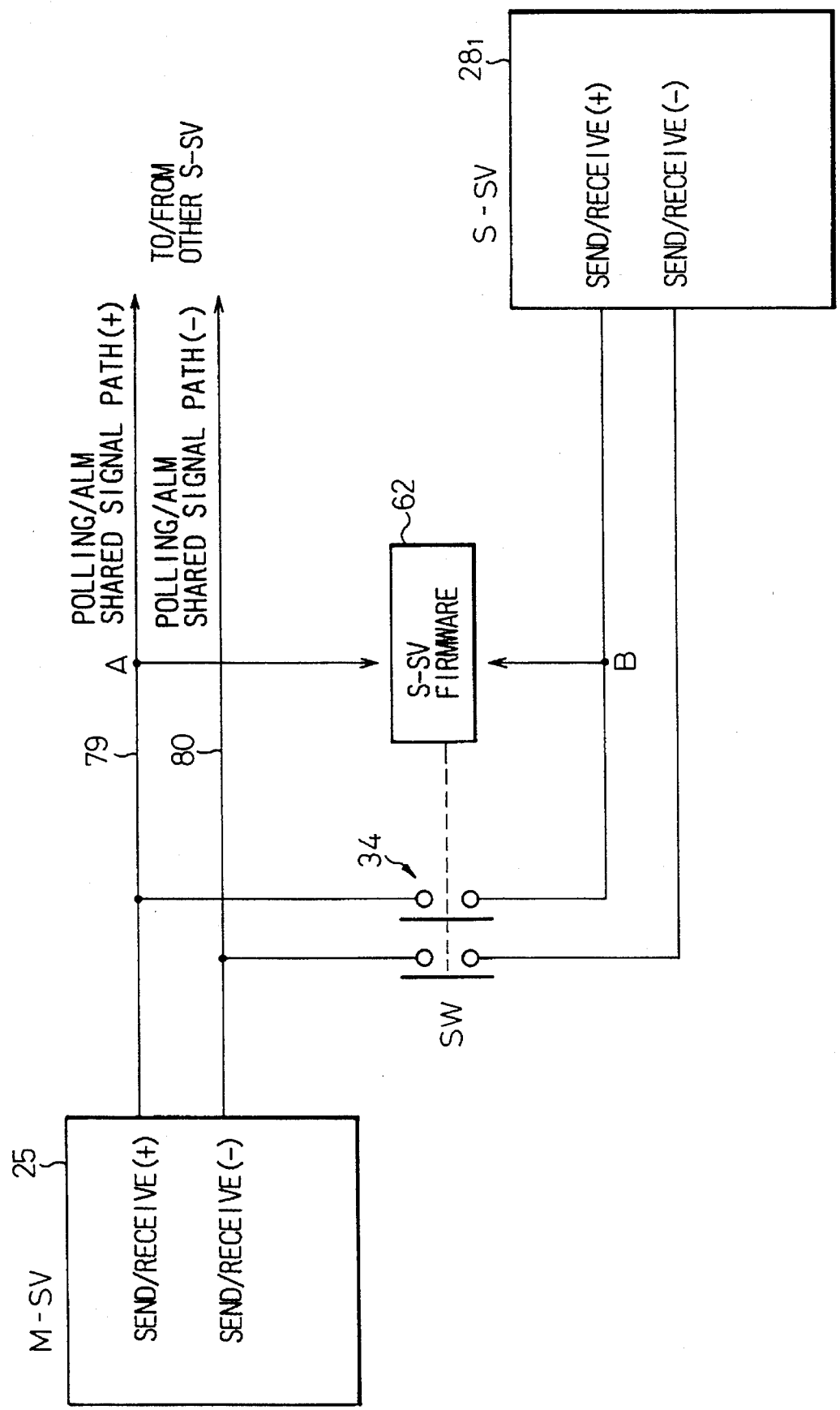
FIG. 21 is a block diagram showing the configuration of another embodiment of the present invention.

FIG. 21 is a diagram showing the configuration of another embodiment of the present invention, illustrating a common two-wire electrical signal transmission system wherein the polling signal from M-SV to S-SV and the alarm signal from S-SV to M-SV are transmitted over a pair of common balanced transmission lines.

A positive-polarity polling/alarm shared signal path 79 is connected to a positive-polarity send/receive terminal of the M-SV 25, the same M-SV as described with reference to FIG. 4, while a negative-polarity polling/alarm shared signal path 80 is connected to a negative-polarity send/receive terminal thereof. A positive-polarity send/receive terminal and a negative-polarity polarity send/receive terminal of the S-SV $28_1$, the same S-SV as described with reference to FIG. 5, are connected via a relay 34 to the positive-polarity polling/alarm shared signal path 79 and the negative-polarity polling/alarm shared signal path 80, respectively. S-SV firmware 62 explained with reference to FIG. 20 monitors a signal on the positive-polarity polling/alarm shared signal path 79 and a signal on the positive-polarity send/receive terminal of the S-SV $28_1$, and thereby controls the relay 34.

Figure 22:
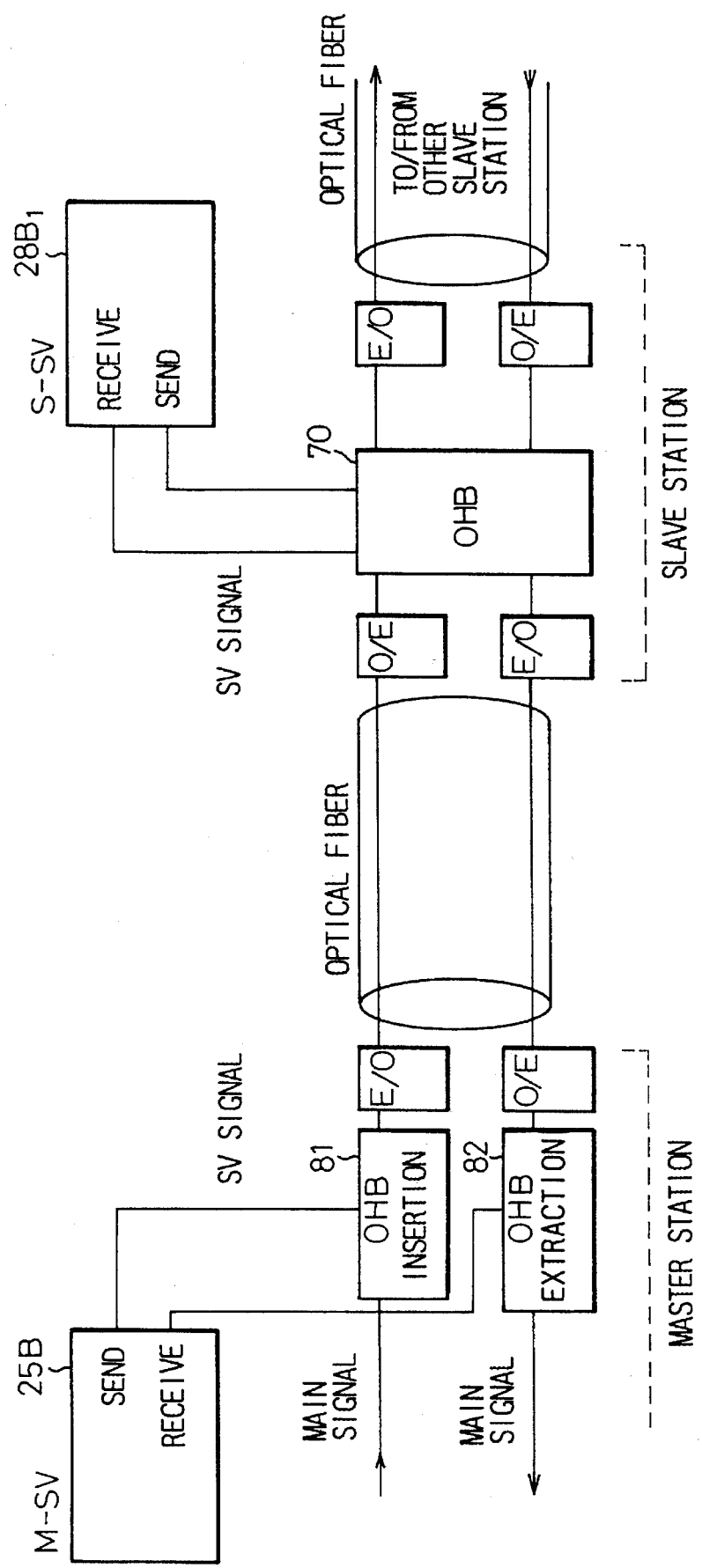
FIG. 22 is a block diagram showing the configuration of another embodiment of the present invention.

FIG. 22 is a diagram showing the configuration of another embodiment of the present invention, wherein the M-SV and S-SV for monitoring the network elements (NEs) forming the network are coupled together by an SV signal transmitted as overhead bits via an optical transmission path which forms part of the network together with the NEs.

In an overhead bit inserter 81, the polling signal output from the M-SV 25B having the configuration shown in FIG. 14 is inserted as an SV signal as overhead bits of a main signal. The alarm signal output from the S-SV and contained as an SV signal as overhead bits of a main signal is extracted from the main signal by an overhead bit extractor 82 and is fed to the M-SV 25B. In an overhead bit processor 70, the alarm signal output from the S-SV $28B_1$, the same S-SV as described with reference to FIG. 15, is inserted as an SV signal as overhead bits of a main signal, while an SV signal is extracted from the overhead bits of a main signal and is fed to the S-SV $28B_1$.

Figure 23:
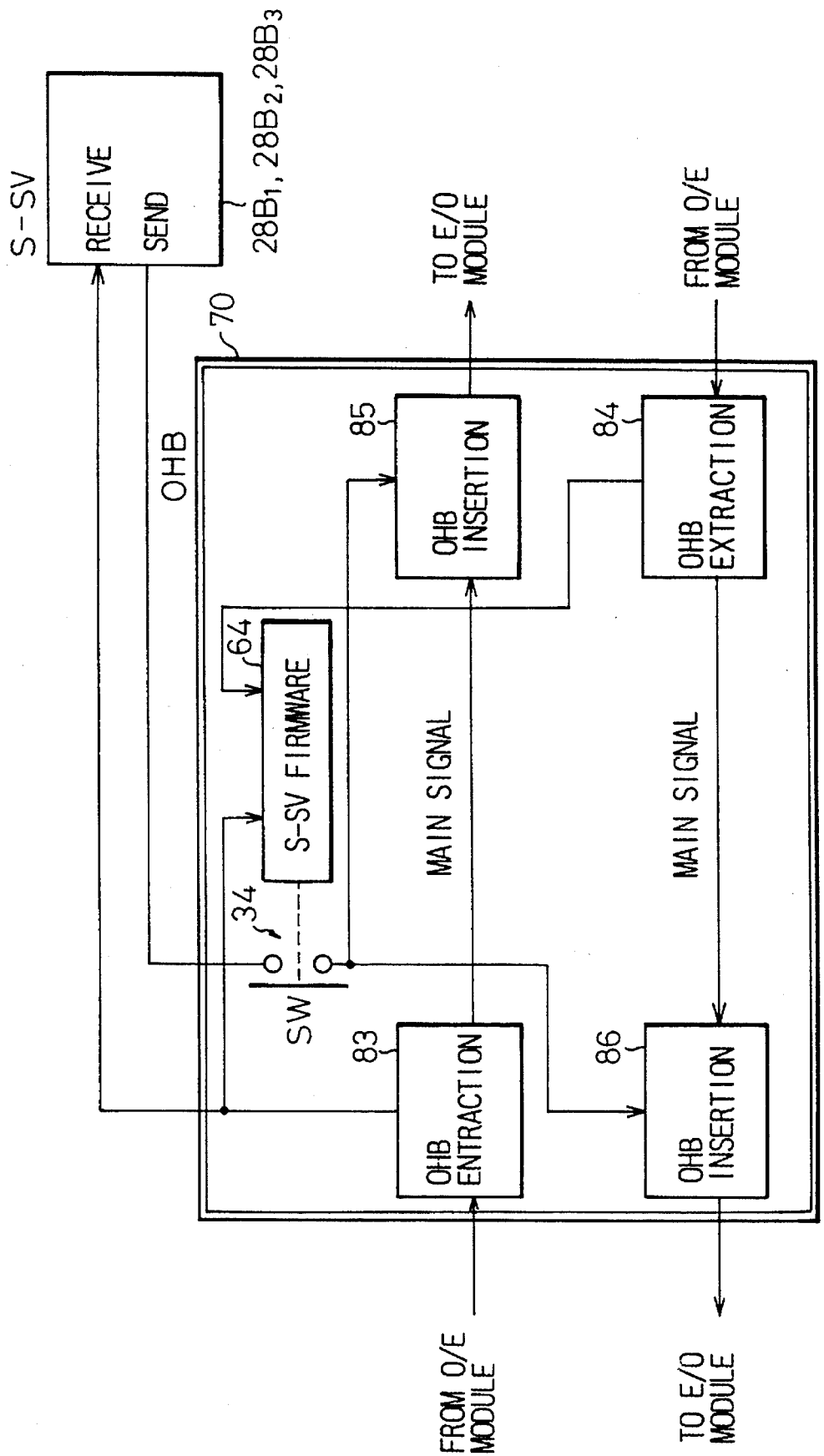
FIG. 23 is a block diagram showing the configuration of an overhead-bit processor 70 in the embodiment shown in FIG. 22.

FIG. 23 is a diagram showing the configuration of the overhead bit processor 70. Overhead bit extractors 83, 84 extract an SV signal from the overhead bits of a main signal and feed the extracted signal to the S-SV, $28B_1$, $28B_2$, $28B_3$. The SV signal from the S-SV, $28B_1$, $28B_2$, $28B_3$, is fed via a switch 34 to overhead bit inserters 85, 86, where the signal is inserted as overhead bits of a main signal. S-SV firmware 64 monitors the contents of the SV signal extracted by the overhead bit extractor 83, and thereby controls the switch 34.

Figure 24:
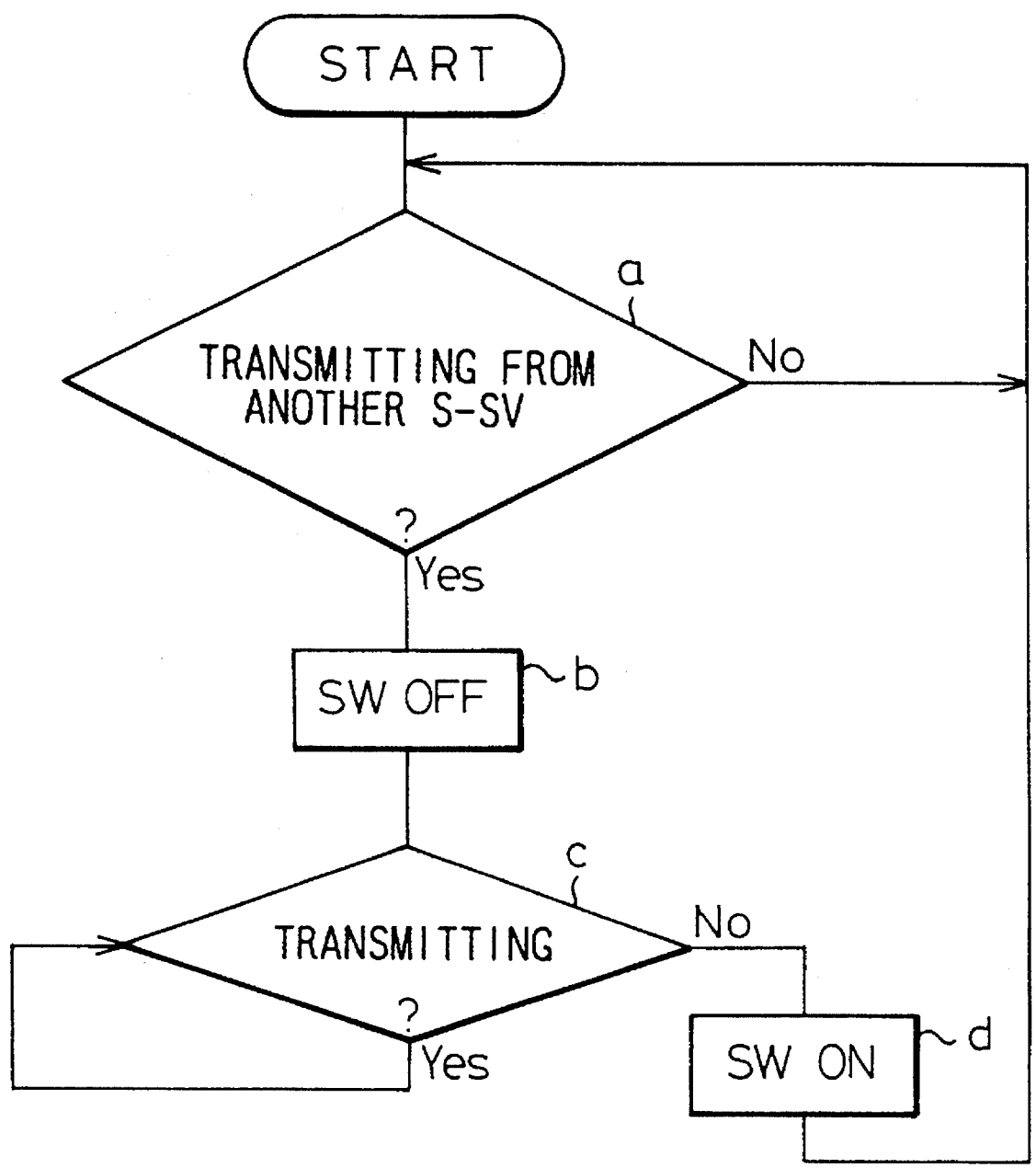
FIG. 24 is a flowchart illustrating the operation of S-SV firmware in the embodiment shown in FIG. 23.

FIG. 24 is a flowchart illustrating the operation of the S-SV firmware 64. In the initial condition, the switch 34 is on. First, a check is made for an alarm signal from other S-SV (step a); if there is such an alarm signal in transmission, the switch 34 is turned off (step b), and after the transmission of the signal is completed (step c), the switch 34 is turned on (step d) and the process returns to step a. In this manner, when there is detected an alarm signal transmission from another S-SV, the switch 34 is turned off, preventing the S-SV signal from its associated S-SV from colliding with the alarm signal.

Figure 25:
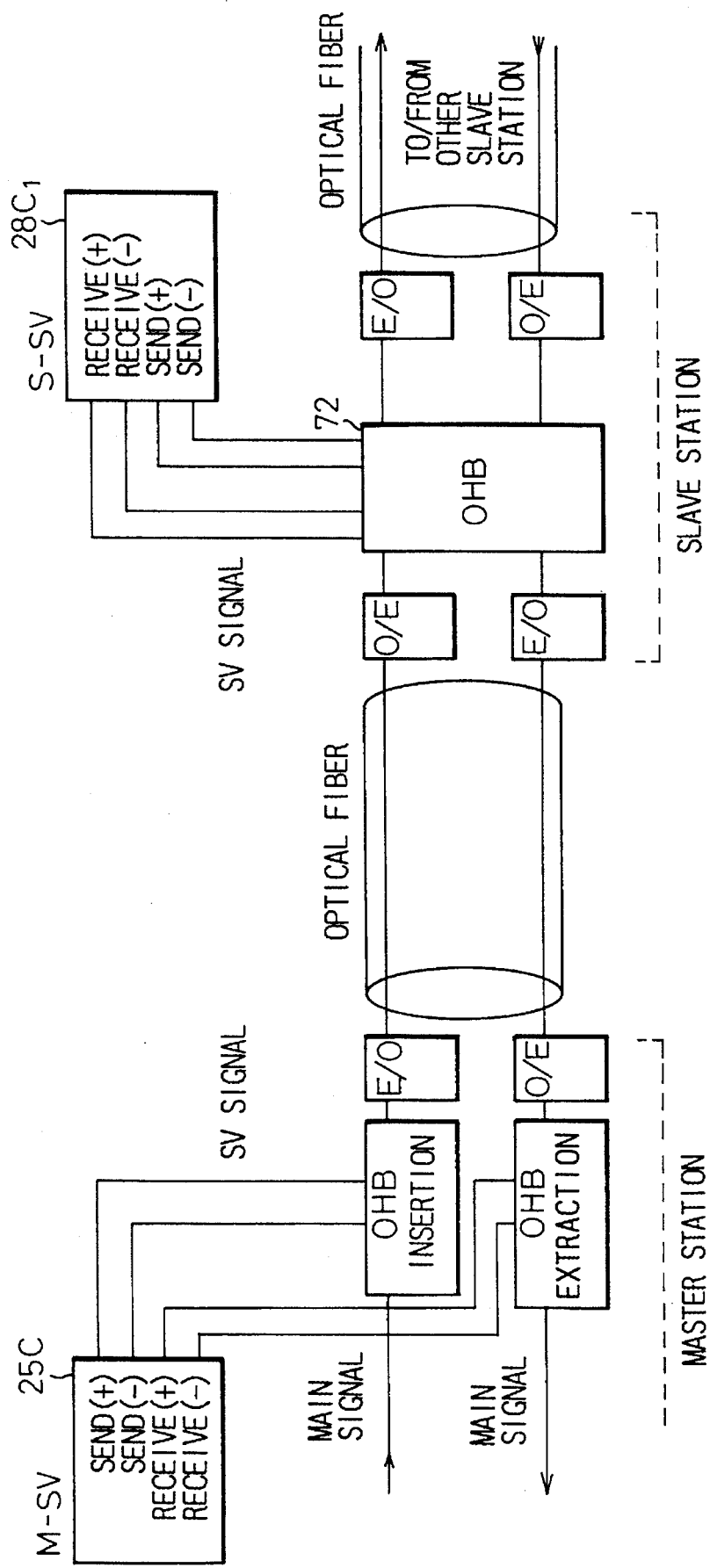
Figure 26:
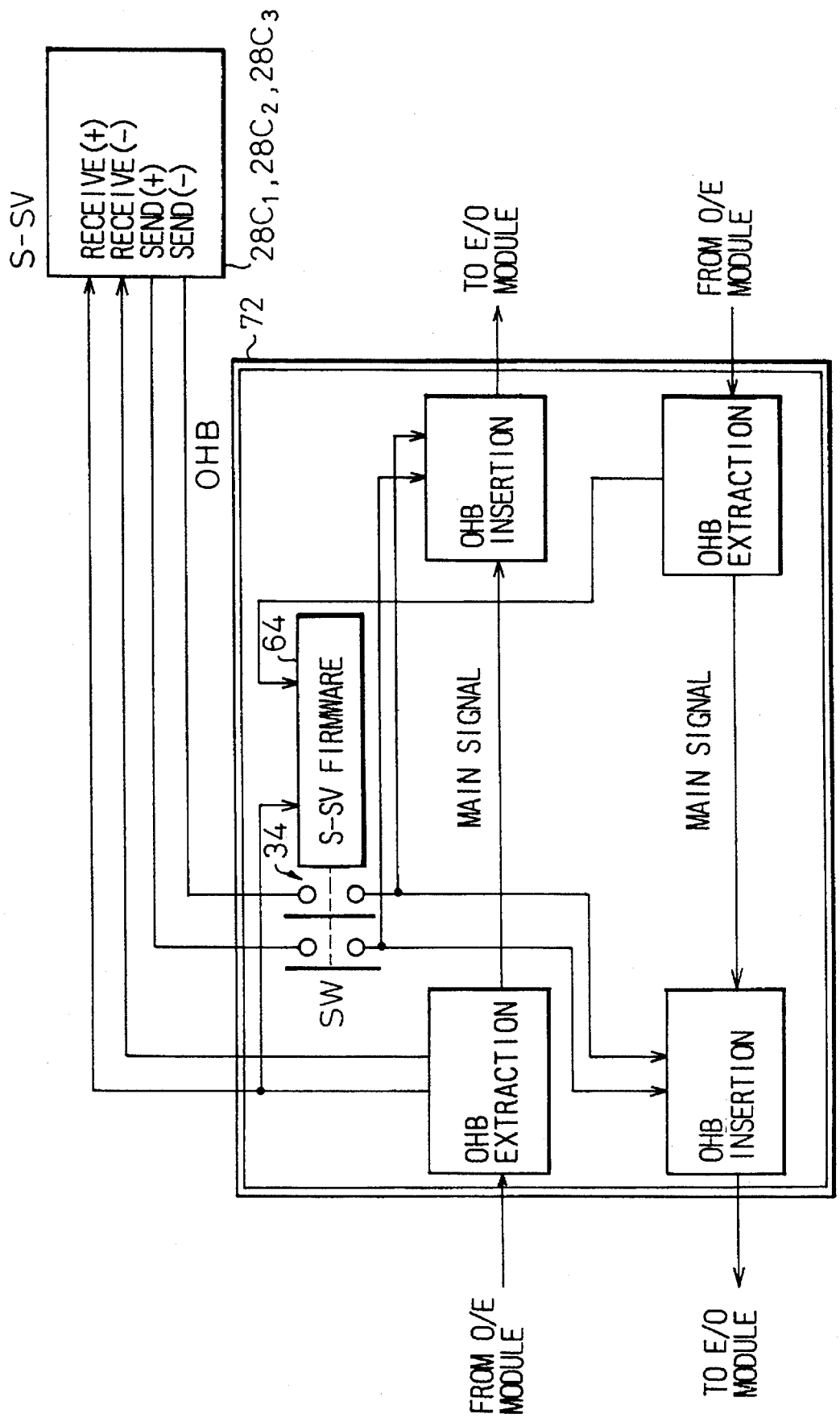
FIG. 26 is a block diagram showing the configuration of an overhead-bit processor 72 in the embodiment shown in FIG. 25.

FIG. 25 is a diagram showing the configuration of another embodiment of the present invention, and FIG. 26 shows the configuration of the overhead bit processor 72 shown in FIG. 25. The difference from the foregoing embodiment described in FIGS. 22 and 23 is that the embodiment of FIG. 25 employs a four-wire electrical signal transmission system to carry SV signals via balanced transmission line pairs.

Figure 27:
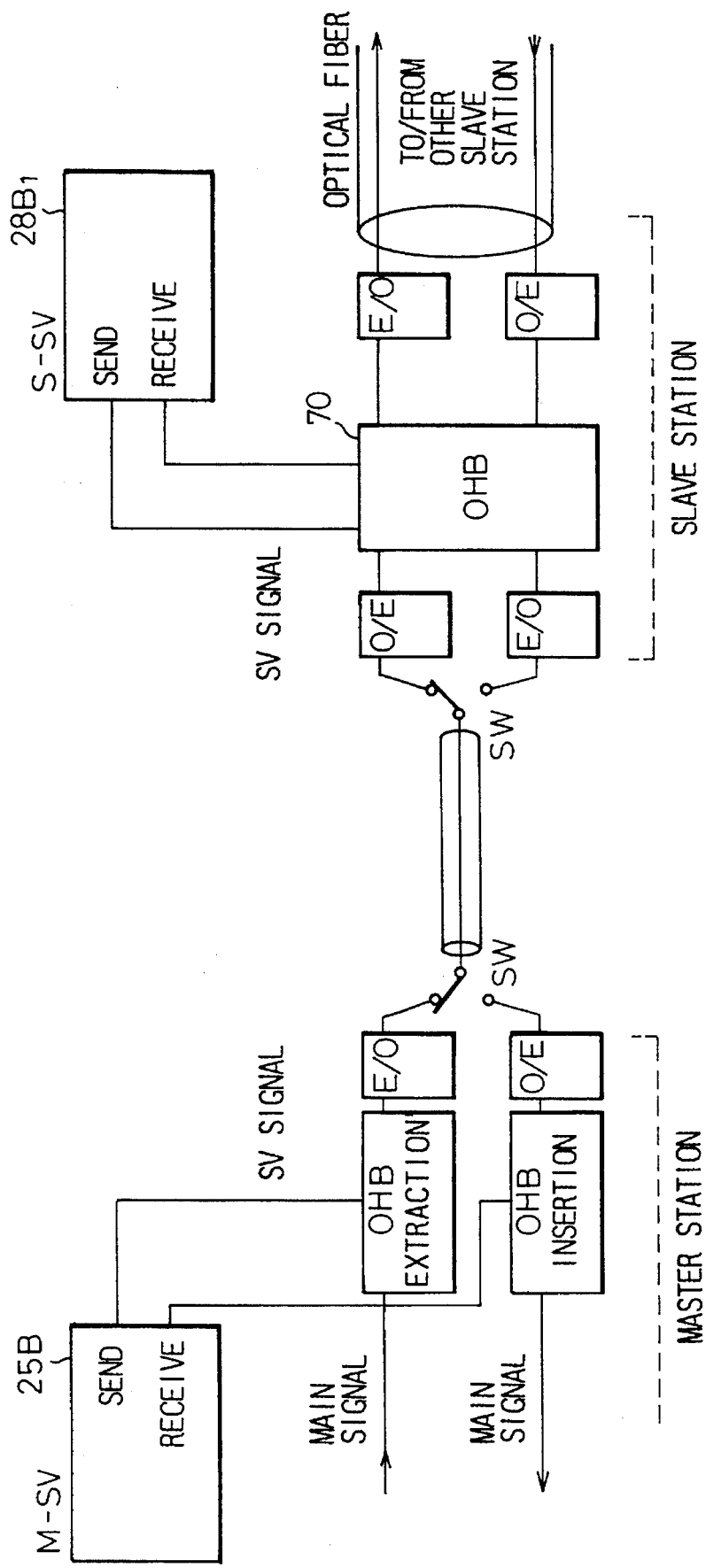
FIG. 27 is a block diagram showing the configuration of another embodiment of the present invention.

FIG. 27 is a diagram showing the configuration of another embodiment of the present invention. The difference from the embodiment of FIG. 22 is that the embodiment of FIG. 27 employs time compression multiplexing (TCM) to realize two-way communications, using a single optical fiber, for the optical transmission path.

Figure 28:
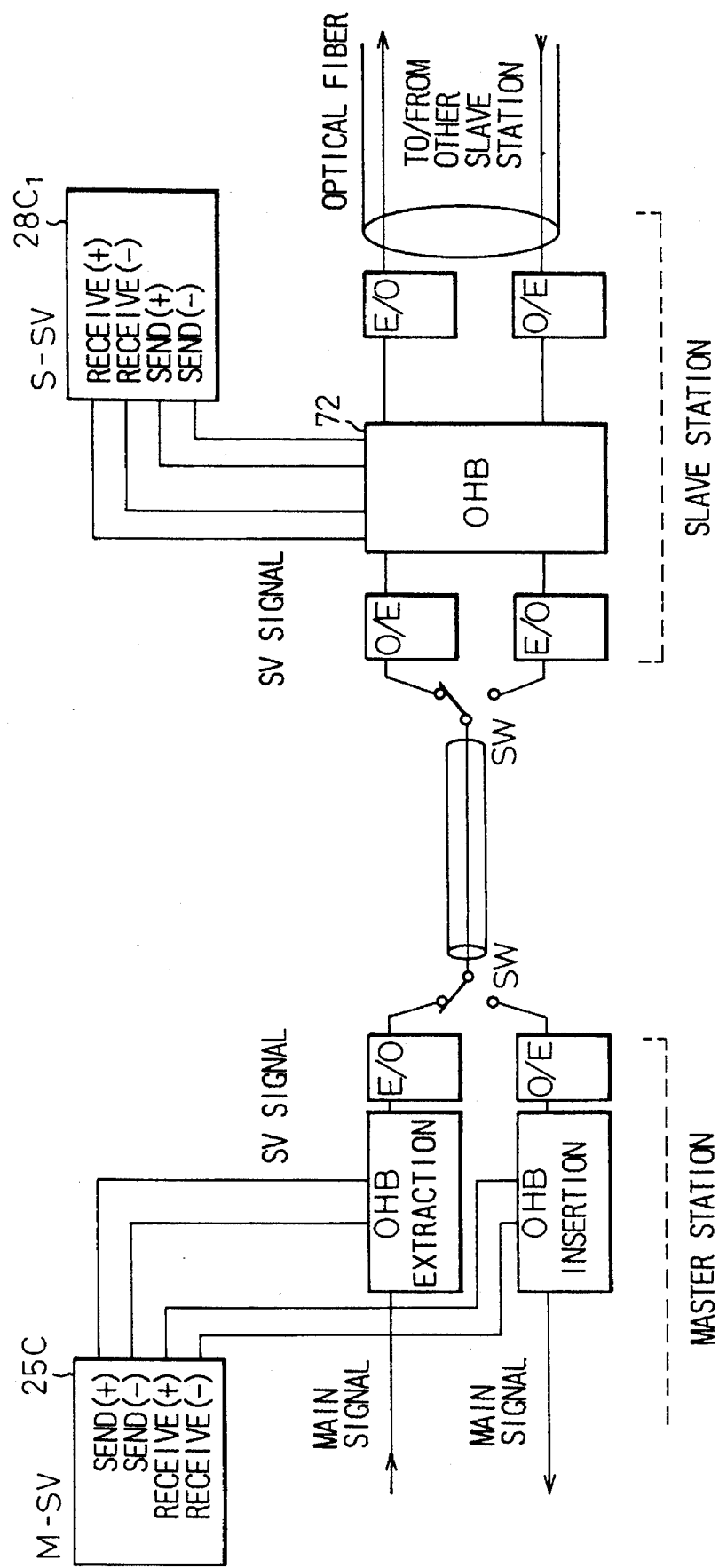
FIG. 28 is a block diagram showing the configuration of another embodiment of the present invention.

FIG. 28 is a diagram showing the configuration of another embodiment of the present invention. In the embodiment of FIG. 28, a four-wire electrical signal transmission system is employed for communication between M-SV and S-SV.

Figure 29:
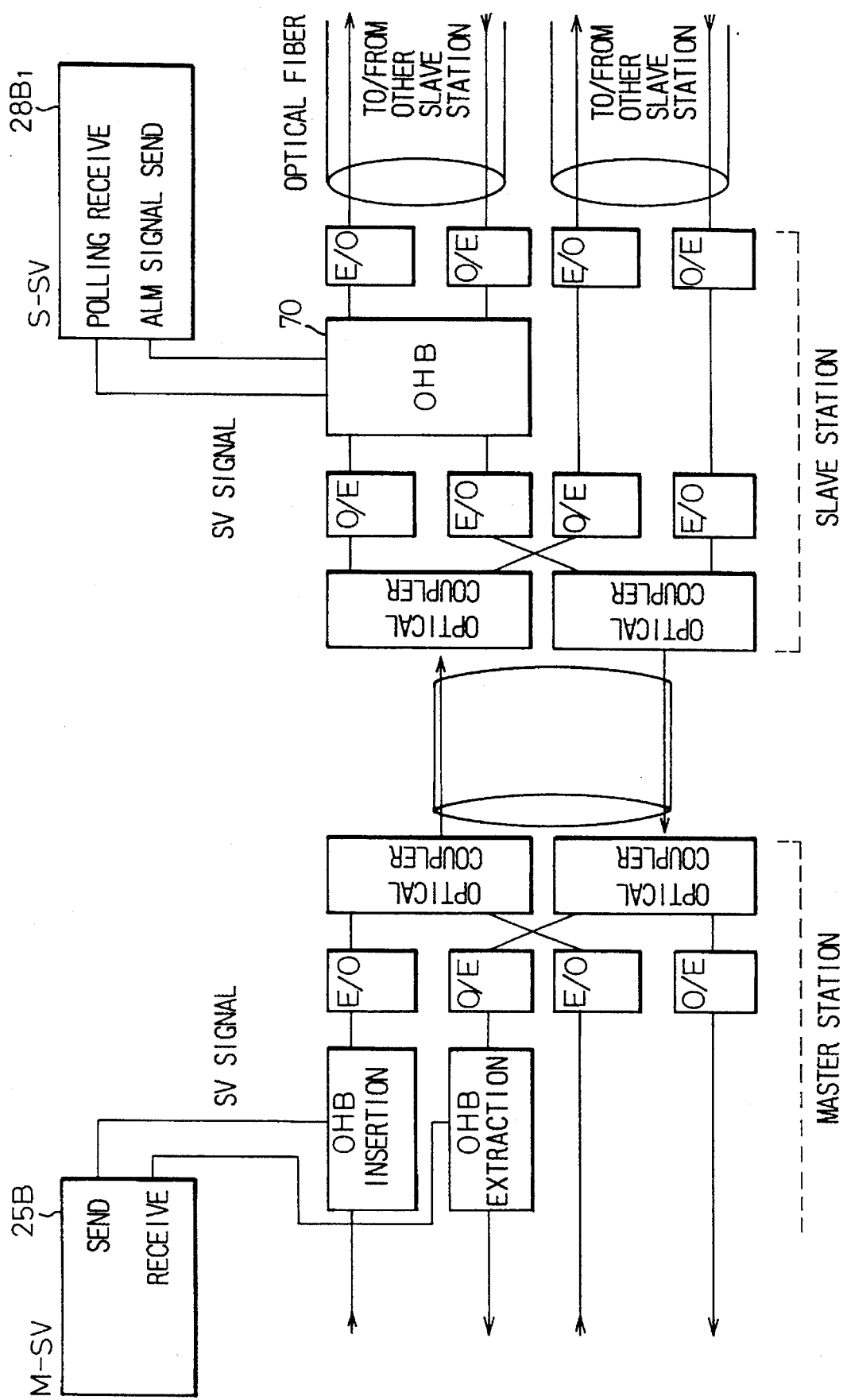
FIG. 29 is a block diagram showing the configuration of another embodiment of the present invention.
Figure 30:
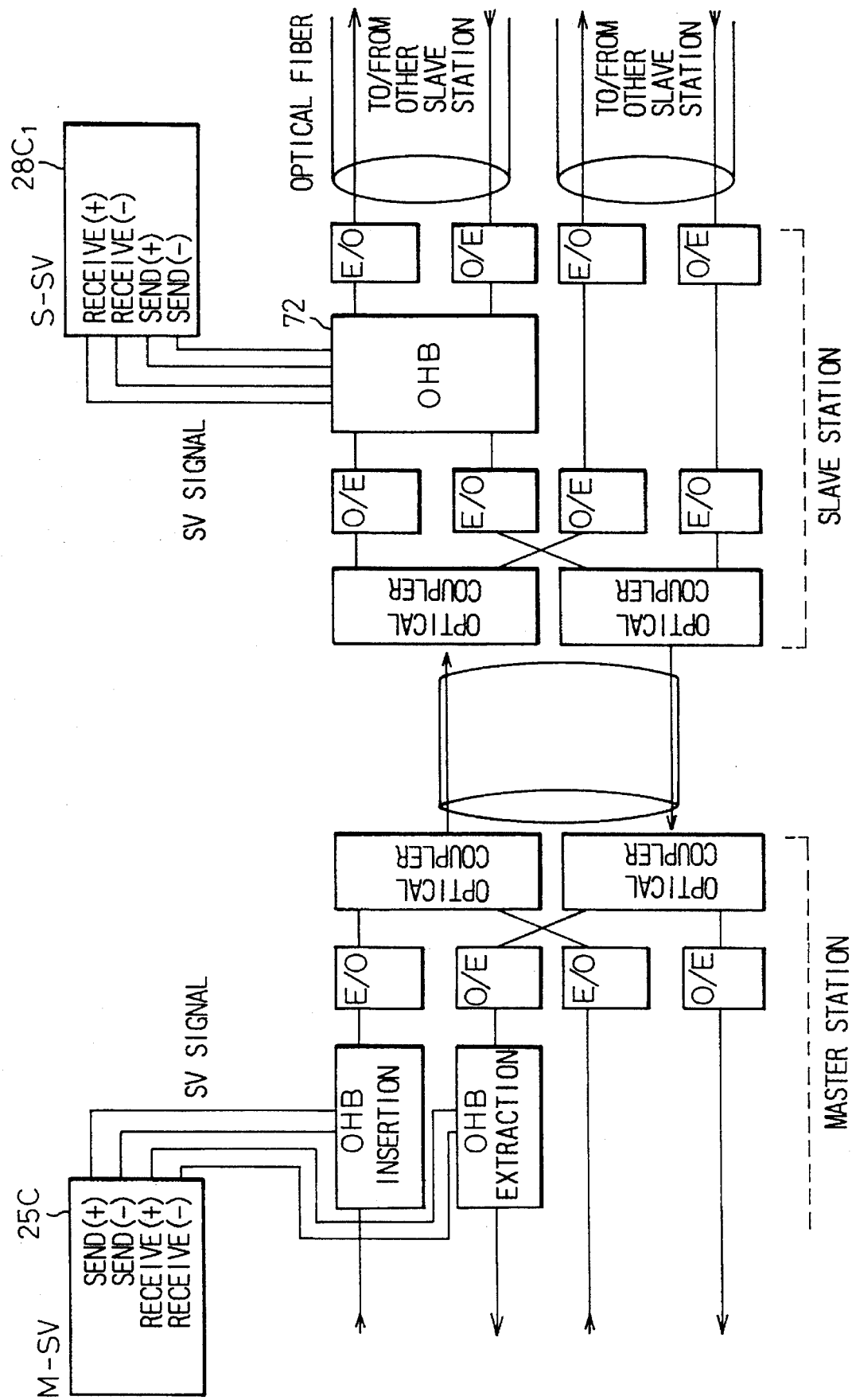
FIG. 30 is a block diagram showing the configuration of another embodiment of the present invention.

FIGS. 29 and 30 are diagrams each showing the configuration of another embodiment of the present invention. In the embodiments shown in FIGS. 29 and 30, wavelength division multiplexing (WDM) is employed which enables transmission of lights of different wavelengths on a single optical fiber. Furthermore, in the embodiment of FIG. 30, a four-wire electrical signal transmission system is employed for communication between M-SV and S-SV.

Figure 31:
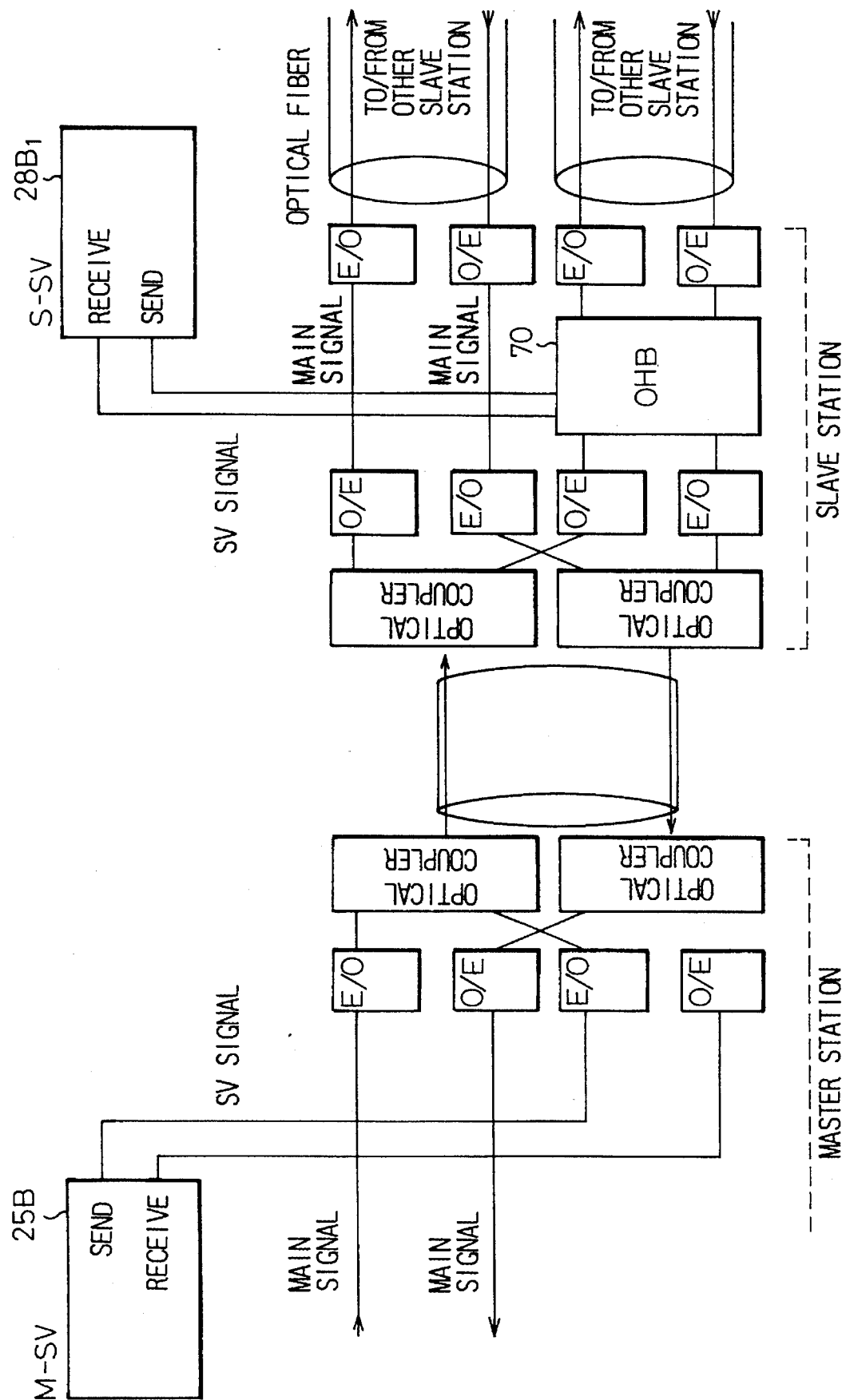
FIG. 31 is a block diagram showing the configuration of another embodiment of the present invention.
Figure 32:
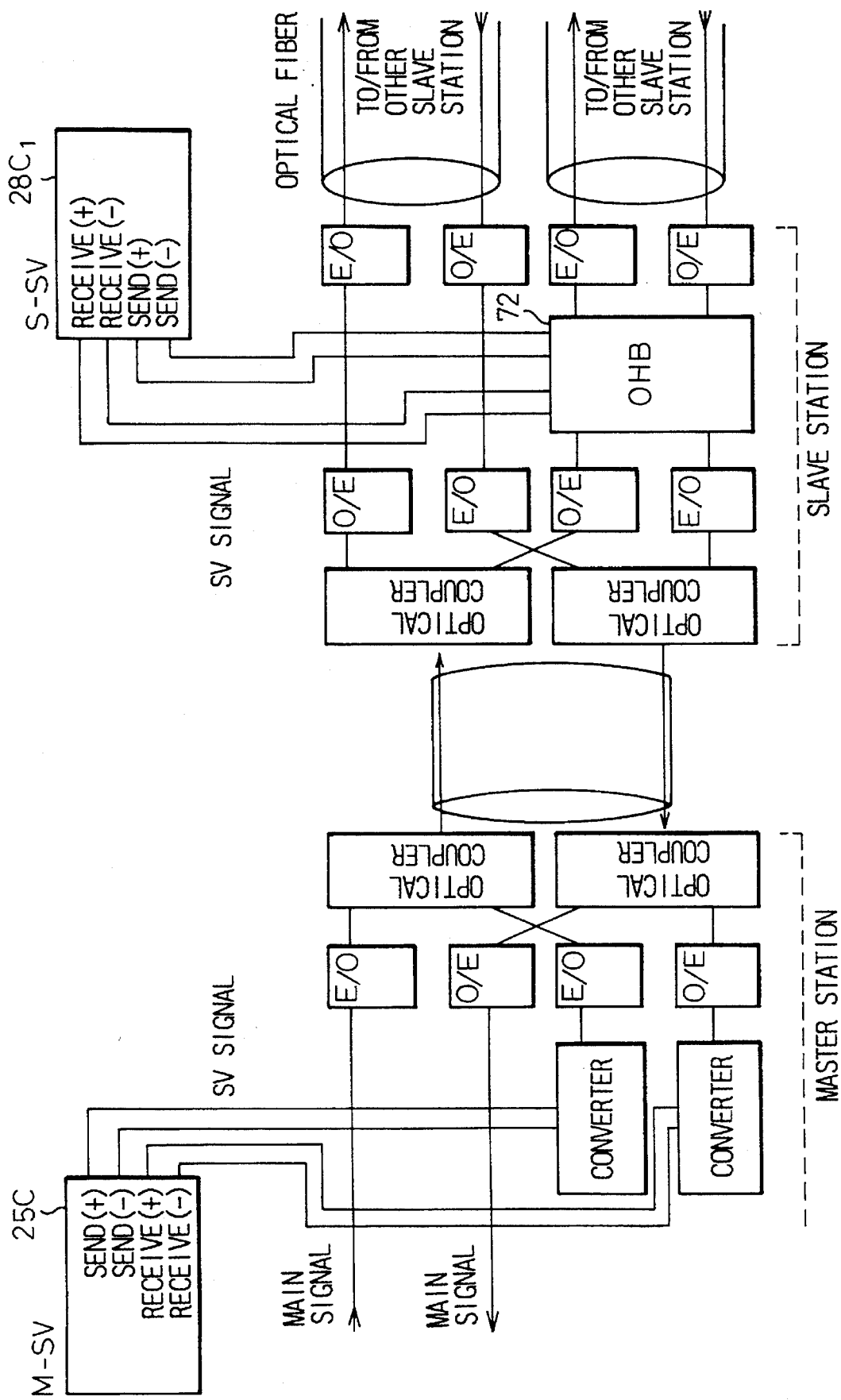
FIG. 32 is a block diagram showing the configuration of another embodiment of the present invention.

FIGS. 31 and 32 are diagrams each showing the configuration of another embodiment of the present invention. The embodiments shown in FIGS. 31 and 32 also employ WDM and are configured to transmit only an SV signal using light of a specific wavelength.

Figure 33:
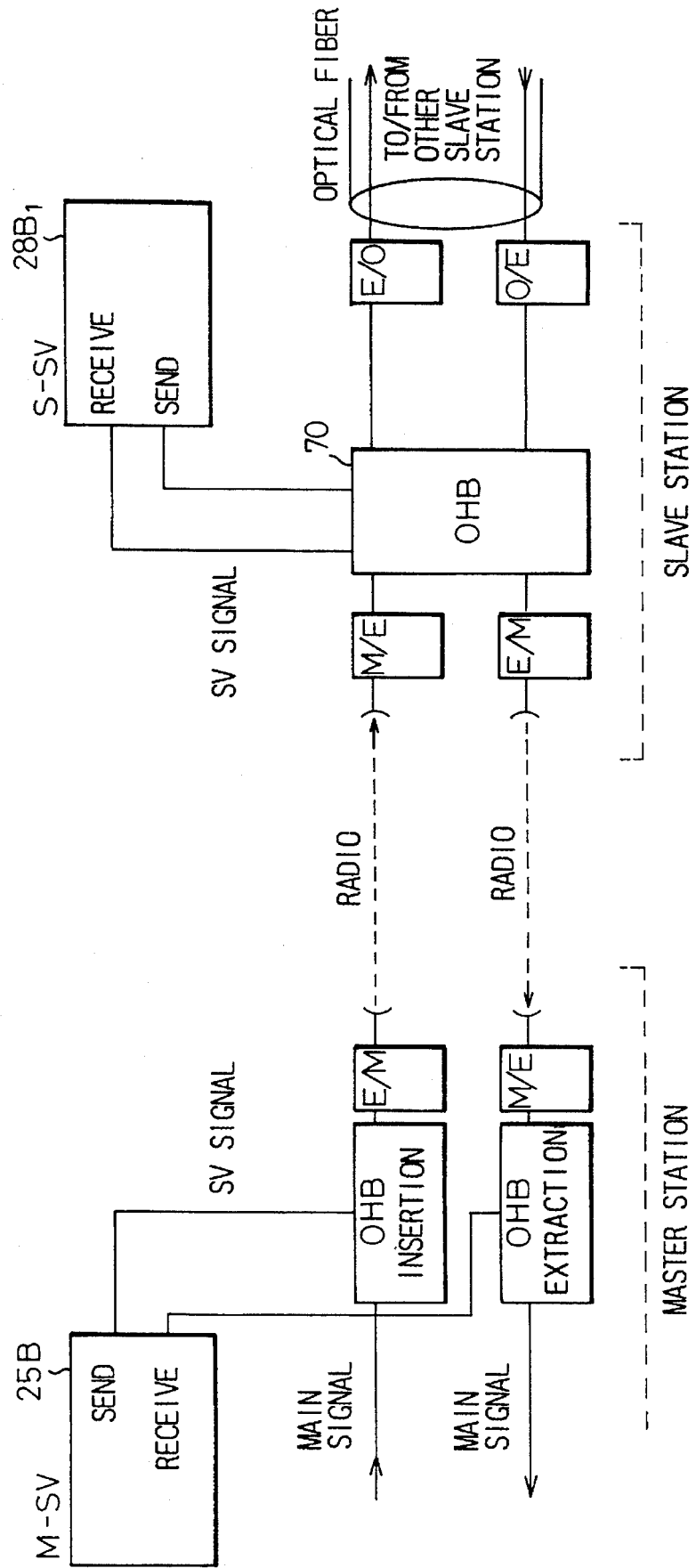
FIG. 33 is a block diagram showing the configuration of another embodiment of the present invention.
Figure 34:
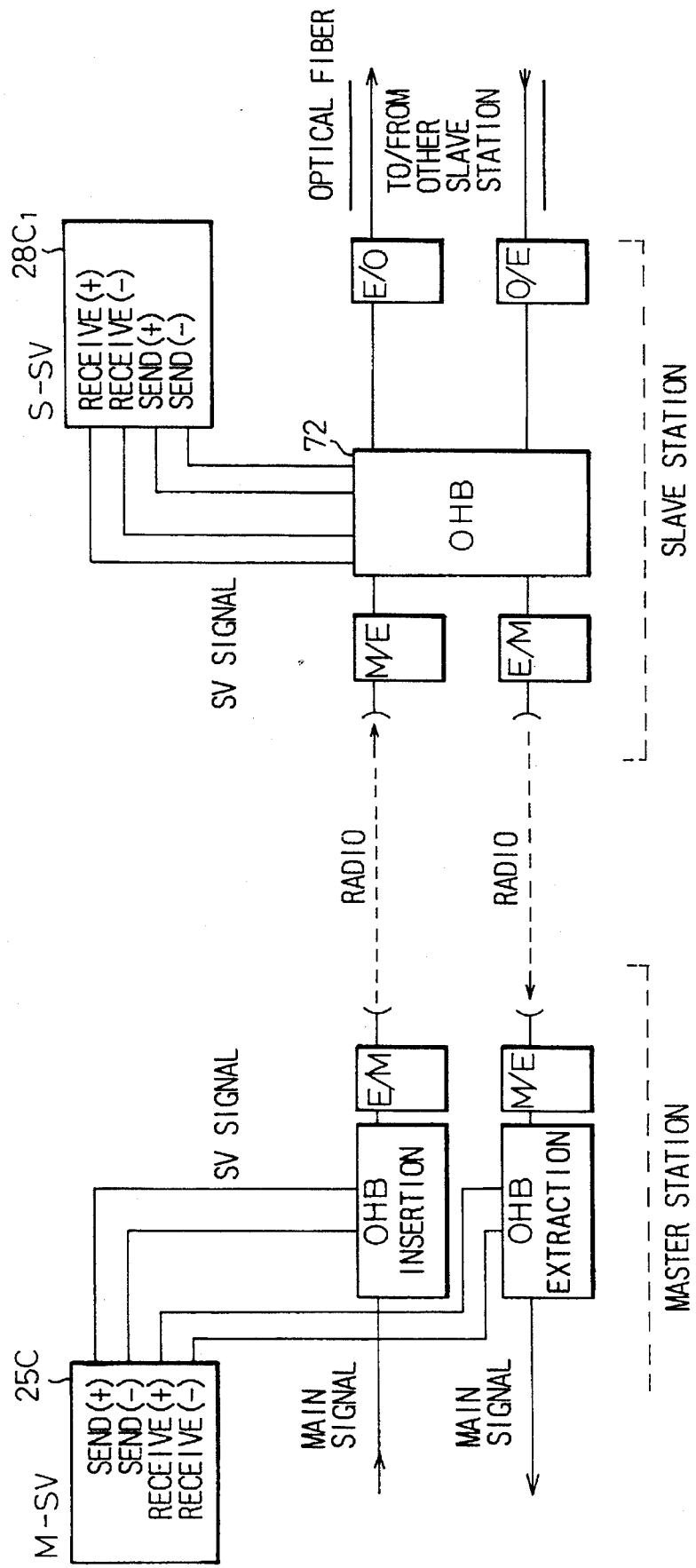
FIG. 34 is a block diagram showing the configuration of another embodiment of the present invention.

FIGS. 33 and 34 are diagrams each showing the configuration of another embodiment of the present invention. The embodiments shown in FIGS. 33 and 34 employ a radio transmission path instead of an optical transmission path. Furthermore, the embodiment of FIG. 34 employs a four-wire electrical signal transmission system for communication between M-SV and S-SV.

I claim:

1. A remote supervisory system for centralized supervision of a plurality of network elements forming a communications network, comprising:

a plurality of slave supervisory apparatuses coupled to the respective network elements;

a master supervisory apparatus;

a first transmission path coupled to the master supervisory apparatus;

a plurality of second transmission paths coupled to the respective slave supervisory apparatuses;

a plurality of switch means connected between the first transmission path and the plurality of second transmission paths; and control means for controlling the switch means in accordance with the presence of a signal on the first transmission path and also with the presence of a signal on the second transmission paths, wherein the control means includes:
      a first signal detection circuit for detecting the presence of a signal on the first transmission path and thereby outputting a first detection signal;
      a second signal detection circuit for detecting the presence of a signal on the second transmission paths and thereby outputting a second detection signal;
      an exclusive-OR circuit for accepting the first and second detection signals and outputting the exclusive-OR of the first and second detection signals; and
      a switch activating circuit for activating the switch means in accordance with the output of the exclusive-OR circuit.

2. A system according to claim 1, wherein the first and second signal detection circuits include a first capacitor and a second capacitor, respectively, for converting a signal consisting of a plurality of pulses into a continuous signal.

3. A system according to claim 2, wherein the first and second transmission paths each include a pair of balanced electrical signal lines.

4. A system according to claim 2, wherein the first transmission path is realized by a transmission of an overhead bit on an optical transmission path that forms part of the communications network.

5. A system according to claim 2, wherein the first transmission path is realized by a transmission of an overhead bit on a radio transmission path that forms part of the communications network.

6. A remote supervisory system for centralized supervision of a plurality of network elements forming a communications network, comprising:

a plurality of slave supervisory apparatuses coupled to the respective network elements;

a master supervisory apparatus;

a first transmission path coupled to the master supervisory apparatus;

a plurality of second transmission paths coupled to the respective slave supervisory apparatuses;

a plurality of switch means connected between the first transmission path and the plurality of second transmission paths; and control means for controlling the switch means in accordance with the presence of a signal on the first transmission path and also with the presence of a signal on the second transmission paths, wherein the first transmission path includes a first polling signal path for carrying a polling signal from the master supervisory apparatus to the slave supervisory apparatus, and a first alarm signal path for carrying an alarm signal from the slave supervisory apparatus to the master supervisory apparatus, the second transmission paths each include a second polling signal path for carrying the polling signal to the slave supervisory apparatus coupled thereto, and a second alarm signal path for carrying the alarm signal from the slave supervisory apparatus coupled thereto, each of said switch means being connected between the first alarm signal path and the second alarm signal path, and the second polling signal path being connected to the first polling signal path, and wherein when a signal is present on the first alarm signal path, the control means holds the switch means off until the signal is removed, and when a signal is present on the second alarm signal path, holds the switch means on until the signal vanishes.

7. A system according to claim 6, wherein the first and second polling signal paths and the first and second alarm signal paths include a pair of balanced electrical signal lines.

8. A remote supervisory system for centralized supervision of a plurality of network elements forming a communications network, comprising:

a plurality of slave supervisory apparatuses coupled to the respective network elements;

a master supervisory apparatus a first transmission path coupled to the master supervisory apparatus;

a plurality of second transmission paths coupled to the respective slave supervisory apparatuses;

a plurality of switch means connected between the first transmission path and the plurality of second transmission paths; and control means for controlling the switch means in accordance with the presence of a signal on the first transmission path and also with the presence of a signal on the second transmission paths, wherein when a signal is present on the second transmission path or when a polling signal destined for the slave supervisory apparatus from the master supervisory apparatus is present on the first transmission path, the control means holds the switch means on until the signal vanishes, and when an alarm signal destined for the master supervisory apparatus from the slave supervisory apparatus is present on the first transmission path, holds the switch means off until the signal vanishes.

9. A system according to claim 8, wherein the first and second transmission paths include a pair of balanced electrical signal lines.

10. A remote supervisory system for centralized supervision of a plurality of network elements forming a communications network, comprising:

a plurality of slave supervisory apparatuses coupled to the respective network elements;

a master supervisory apparatus;

a first transmission path coupled to the master supervisory apparatus;

a plurality of second transmission paths coupled to the respective slave supervisory apparatuses;

a plurality of switch means connected between the first transmission path and the plurality of second transmission paths; and control means for controlling the switch means in accordance with the presence of a signal on the first transmission path and also with the presence of a signal on the second transmission paths, wherein the first transmission path is realized by a transmission of an overhead bit for carrying a supervisory SV signal over a main transmission path that forms part of the network, the second transmission paths each include an extraction electrical signal line for carrying the SV signal extracted from the main transmission path to the slave supervisory apparatus coupled thereto, and an insertion electrical signal line for inserting the SV signal from the slave supervisory apparatus coupled thereto into the main transmission path, the switch means is connected in series to the insertion electrical signal line, and the control means holds the switch means off when an alarm signal from other slave supervisory apparatus is present on the extraction electrical signal line, until the signal vanishes.

11. A system according to claim 10, wherein the main transmission path is an optical transmission path.

12. A system according to claim 11, wherein the extraction electrical signal line and the insertion electrical signal line each include a pair of balanced electrical signal lines.

13. A system according to claim 11, wherein the optical transmission path is a time-compression-multiplexing optical transmission path.

14. A system according to claim 12, wherein the optical transmission path is a time-compression-multiplexing optical transmission path.

15. A system according to claim 11, wherein the optical transmission path is a wavelength-division-multiplexing optical transmission path.

16. A system according to claim 12, wherein the optical transmission path is a wavelength-division-multiplexing optical transmission path.

17. A system according to claim 10, wherein the main transmission path is a radio transmission path.

18. A system according to claim 17, wherein the extraction electrical signal line and the insertion electrical signal line each include a pair of balanced electrical signal lines.

* * * * *